US012386292B2

(12) United States Patent
Omata

(10) Patent No.: US 12,386,292 B2
(45) Date of Patent: Aug. 12, 2025

(54) IMAGE FORMING APPARATUS PROVIDED WITH HEATER INCLUDING HEAT GENERATING MEMBERS WITH DIFFERENT LENGTHS

(71) Applicant: CANON KABUSHIKI KAISHA, Tokyo (JP)

(72) Inventor: Haruhiko Omata, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 19 days.

(21) Appl. No.: 18/537,247

(22) Filed: Dec. 12, 2023

(65) Prior Publication Data

US 2024/0210858 A1 Jun. 27, 2024

(30) Foreign Application Priority Data

Dec. 27, 2022 (JP) ................................. 2022-209572

(51) Int. Cl.
*G03G 15/20* (2006.01)
*G03G 15/00* (2006.01)

(52) U.S. Cl.
CPC ..... *G03G 15/2039* (2013.01); *G03G 15/2042* (2013.01); *G03G 15/2053* (2013.01); *G03G 15/80* (2013.01)

(58) Field of Classification Search
CPC ............... G03G 15/20; G03G 15/2003; G03G 15/2039; G03G 15/2042; G03G 15/2053; G03G 15/2064; G03G 15/80
See application file for complete search history.

(56) References Cited

U.S. PATENT DOCUMENTS

| | | | | |
|---|---|---|---|---|
| 7,720,423 | B2 | 5/2010 | Omata | G03G 15/20 |
| 8,218,990 | B2 | 7/2012 | Toyohara et al. | G03G 15/20 |
| 10,488,794 | B2 * | 11/2019 | Wakatsu | G03G 15/2053 |
| 2021/0072680 | A1 | 3/2021 | Yoshida et al. | G03G 15/2039 |
| 2021/0072681 | A1 * | 3/2021 | Wakatsu | G03G 15/2042 |
| 2023/0065569 | A1 * | 3/2023 | Wakatsu | G03G 15/2039 |

FOREIGN PATENT DOCUMENTS

| | | |
|---|---|---|
| JP | H07-191571 | 7/1995 |
| JP | 2021-043248 | 3/2021 |

* cited by examiner

*Primary Examiner* — Sophia S Chen
(74) *Attorney, Agent, or Firm* — Venable LLP

(57) ABSTRACT

An image forming apparatus includes a heater including first and second heating members, the first heating member is longer than the second heating member in a widthwise direction. The image forming apparatus performs image formation on a first recording material shorter than the second heating member and a second recording material shorter than the first heating member and longer than the second heating member. In a case that first and second sheets are the first recording material, an electric power supplied to the first heating member is a first electric power while the first sheet passes through a nip, and in a case that the first sheet is the first recording material and the second sheet is the second recording material, the electric power is a second electric power smaller than the first electric power while the first sheet passes through the nip.

12 Claims, 11 Drawing Sheets

(a)

(b)

IMAGE FORMING APPARATUS PROVIDED WITH HEATER INCLUDING HEAT GENERATING MEMBERS WITH DIFFERENT LENGTHS

FIELD OF THE INVENTION AND RELATED ART

The present invention relates to an image forming apparatus such as a printer, copier, facsimile or multifunction printer.

After an image forming apparatus forms a toner image on a recording material, a fixing device fixes the toner image onto the recording material. As a fixing method for fixing the toner image onto the recording material, for example, a thermal fixing method is used in which the recording material is held and conveyed in a fixing nip portion which is formed by a fixing film contacting a pressure roller, then heat and pressure are applied to the recording material to fix the toner image onto the recording material. With respect to a widthwise direction of the fixing nip portion crossing a conveyance direction of the recording material, when small-size paper, which is smaller in width than the maximum width of the recording material that can be printed by the image forming apparatus, is continuously printed, the temperature of a non-passing through area of the fixing film through which the small-size paper does not pass may gradually rise (referred to as non-passing portion temperature rise).

However, if the temperature of the non-passing through area becomes too high, when a large-size paper, which is larger in width than the small-size paper, is printed after printing the small-size paper, there is a possibility that the toner formed in a corresponding range corresponding to the non-passing through area of the large-size paper is overheated and melts, and adheres to the fixing film or the pressure roller (so-called hot offset). In order to suppress this hot offset, an image forming apparatus which idle-rotates the fixing film and the pressure roller after the end of passing of the small-size paper and before the passing of the large-size paper, and performs temperature equalization control which equalizes the temperature of the fixing film in the widthwise direction is proposed (Japanese Laid-Open Patent Application No. H7-191571). Further, an image forming apparatus which heats the fixing film by a heater including a plurality of heat generating members formed to have differing lengths in the widthwise direction corresponding to both small- and large-size paper is proposed (Japanese Laid-Open Patent Application (JP-A) 2021-43248).

Conventionally, when printing small-size paper, the fixing film is heated by supplying electric power to a heat generating member which has a length corresponding to large-size paper in addition to a heat generating member which has a length corresponding to small-size paper. For example, if the fixing film is heated by supplying electric power only to the heat generating member corresponding to the small-size paper, the temperature difference between the portion heated by the heater and the unheated portion becomes too large, and the heated portion of the pressure roller may expand thermally. In such a case, a speed difference arises in the surface speeds between the heated portion and the unheated portion of the rotating pressure roller, and the fixing film may twist, causing it to wrinkle or fracture. In order to prevent this, supplying electric power to the heat generating member having a length corresponding to large-size paper makes it difficult for a speed difference to arise in the surface speeds of the pressure roller when printing small-size paper.

However, as described above, when printing small-size paper, if electric power is supplied to the heat generating member having a length corresponding to large-size paper in addition to the heat generating member having a length corresponding to small-size paper to heat the fixing film, a non-passing portion temperature rise occurs easily. Accordingly, temperature equalization control is conventionally performed after printing small-size paper, and the start of image formation is put on standby until temperature equalization control has completed. Therefore, downtime of the image forming apparatus occurs, and operation efficiency of the image forming apparatus may decrease.

The present invention is made in view of the above issue, and is intended to provide an image forming apparatus which decreases the downtime of the image forming apparatus caused by the non-passing portion temperature rise during printing of small-size paper when the heat generating member corresponding to the large-size paper is heated in addition to the heat generating member corresponding to small-size paper.

SUMMARY OF THE INVENTION

According to an embodiment of the present invention, there is provided an image forming apparatus comprising: a first rotatable member configured to heat a recording material; a heater configured to heat the first rotatable member; the heater provided with a first heat generating member and a second heat generating member, and in a widthwise direction crossing a conveyance direction of the recording material a length of the first heat generating member is longer than a length of the second heat generating member; a second rotatable member configured to form a fixing nip portion in contact with the first rotatable member, the second rotatable member fixing a toner image on the recording material with the first rotatable member; and a control portion configured to control a temperature of the heater by an electric power supplied to the first heat generating member and the second heat generating member, wherein the image forming apparatus is capable of performing image formation on a first recording material of which length is shorter than the second heat generating member in the widthwise direction, and a second recording material of which length is equal to or shorter than the first heat generating member and longer than the second heat generating member, wherein in a case of a job in which a first sheet is the first recording material and a second sheet that is carried successively to the first sheet is the first recording material, an electric power suppled to the first heat generating member is a first electric power while the first recording material as the first sheet passes through the fixing nip portion, and wherein in a case of a job in which the first sheet is the first recording material and the second sheet is the second recording material, the electric power suppled to the first heat generating member is a second electric power smaller than the first electric power while the first recording material as the first sheet passes through the fixing nip portion.

According to an embodiment of the present invention, there is provided an image forming apparatus comprising: a first rotatable member configured to heat a recording material; a heater configured to heat the first rotatable member; the heater provided with a first heat generating member and a second heat generating member, and in a widthwise direction crossing a conveyance direction of the recording material the first heat generating member heating in an outer area of the second heat generating member; a second rotatable member configured to form a fixing nip portion in contact with the first rotatable member, the second rotatable member fixing a toner image on the recording material with the first rotatable member; and a control portion configured to control a temperature of the heater by an electric power supplied to the first heat generating member and the second heat generating member, wherein the image forming apparatus is capable of performing image formation on a first recording material of which length is shorter than the second heat generating member in the widthwise direction, and a second recording material of which length is equal to or shorter than a maximum width where a fixing device is capable of fixing and longer than the second heat generating member, wherein in a case of a job in which a first sheet is the first recording material and a second sheet is the first recording material, an electric power suppled to the first heat generating member is a first electric power while the first recording material as the first sheet passes through the fixing nip portion, and wherein in a case of a job in which the first sheet is the first recording material and the second sheet is the second recording material, the electric power suppled to the first heat generating member is a second electric power smaller than the first electric power while the first recording material as the first sheet passes through the fixing nip portion.

Further features of the present invention will become apparent from the following description of exemplary embodiments with reference to the attached drawings.

Figure 4:
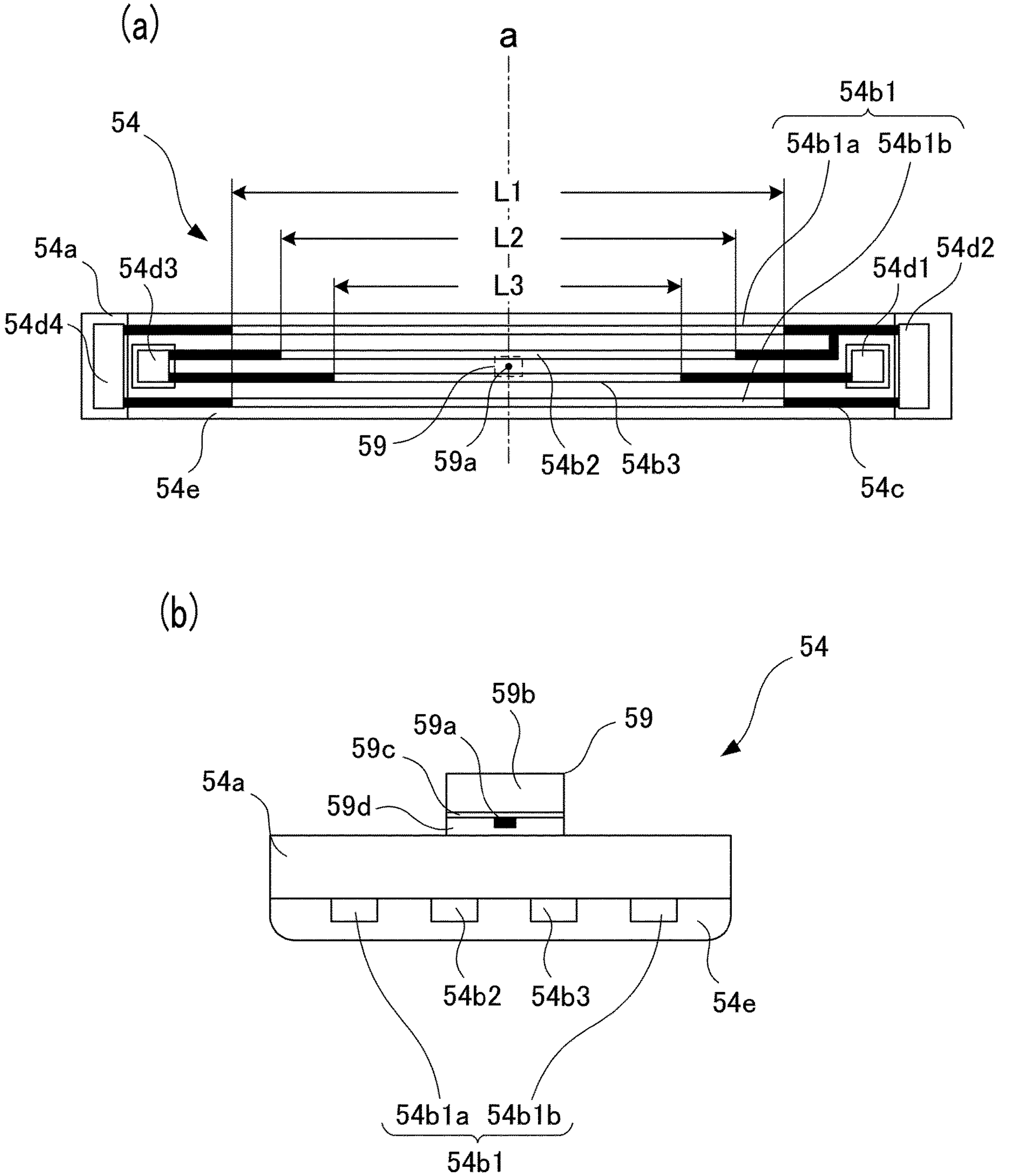

Part (a) of FIG. 4 is a top view showing a heater, and part (b) of FIG. 4 is a sectional view showing the heater.

Figure 5:
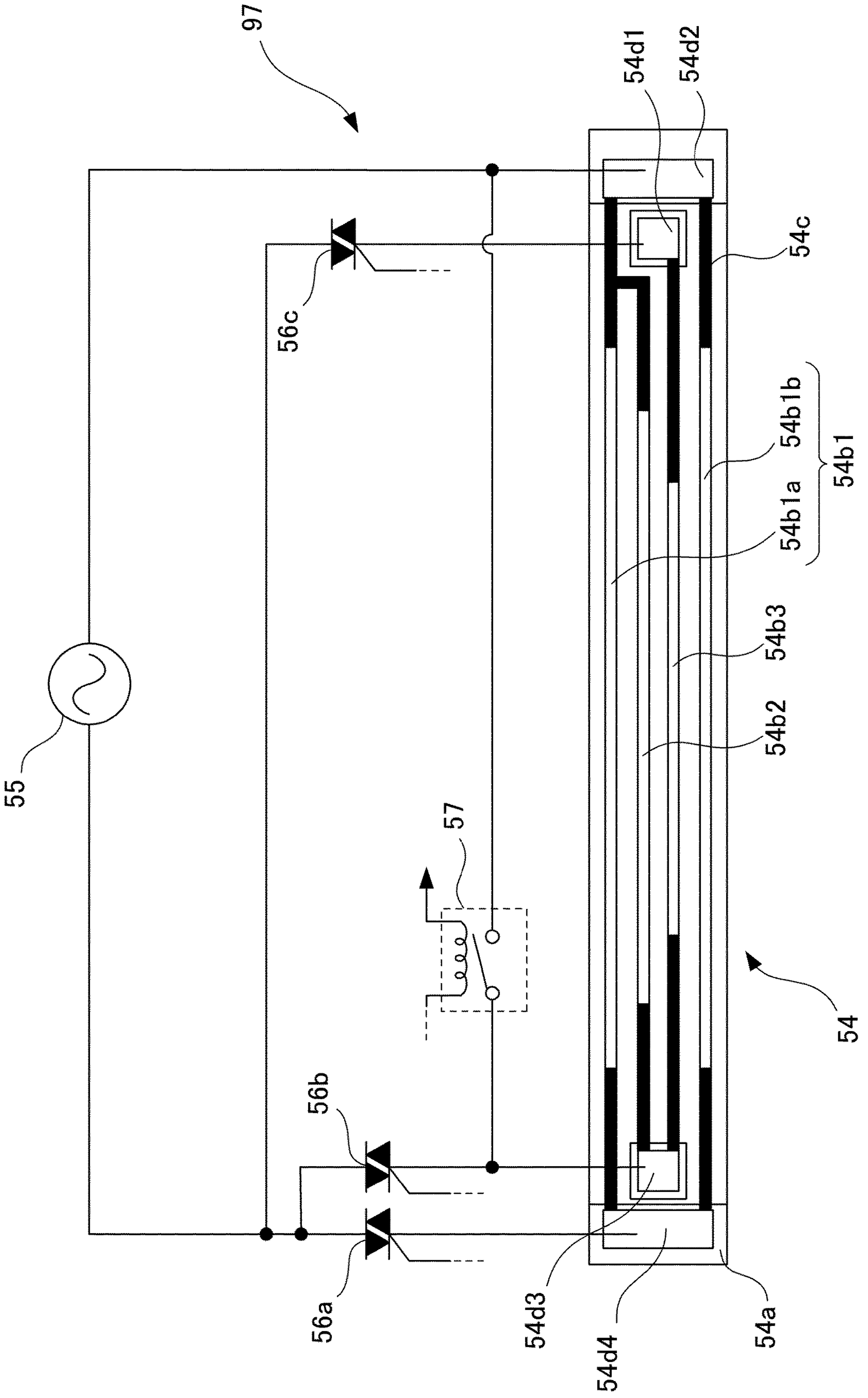

FIG. 5 is a pattern view showing a power control circuit.

Figure 6:
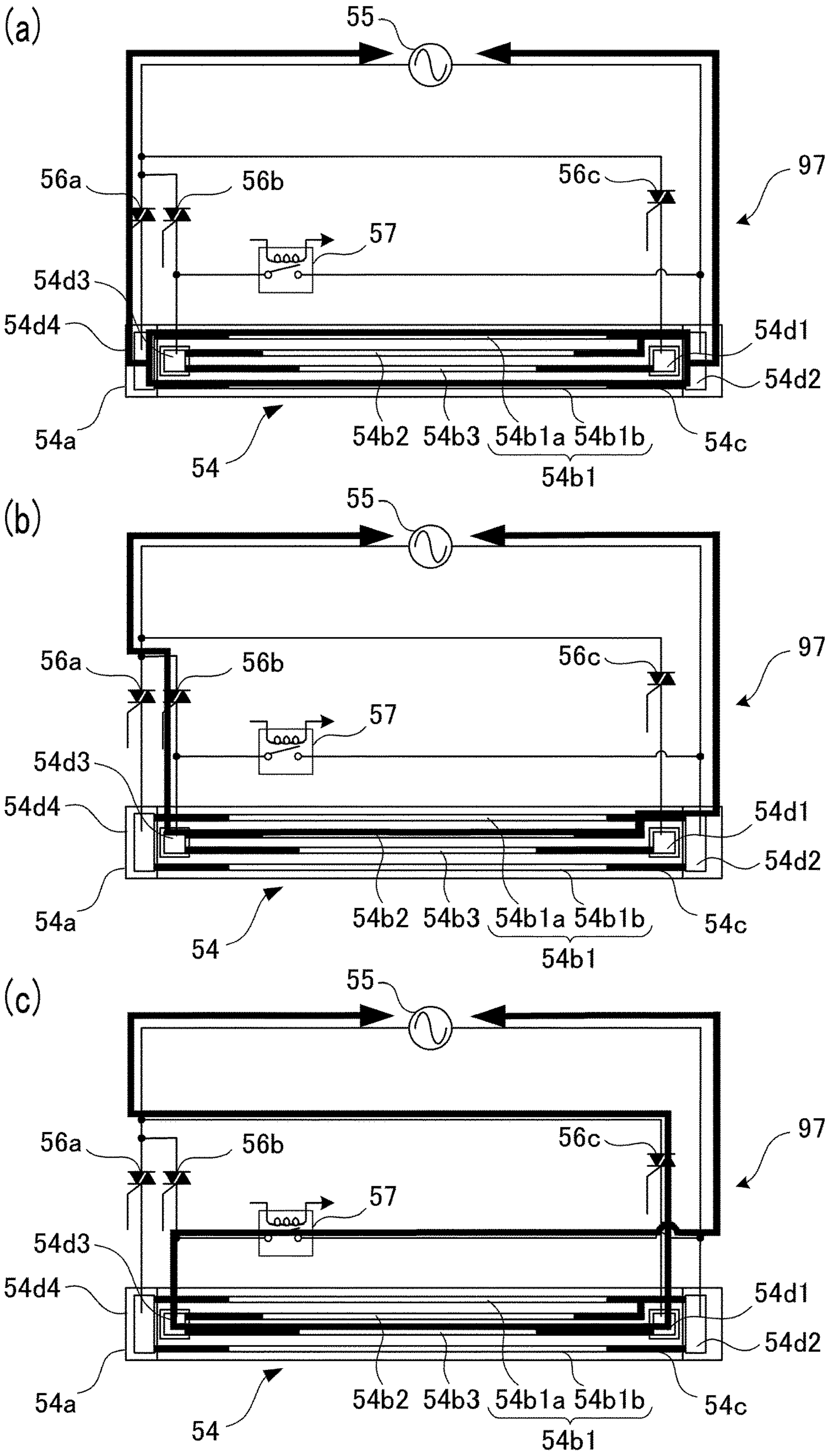

Part (a) of FIG. 6 is a pattern view showing a current path for a first heat generating member, part (b) of FIG. 6 is a pattern view showing a current path for a second heat generating member, and part (c) of FIG. 6 is a pattern view showing a current path for a third heat generating member.

Figure 7:
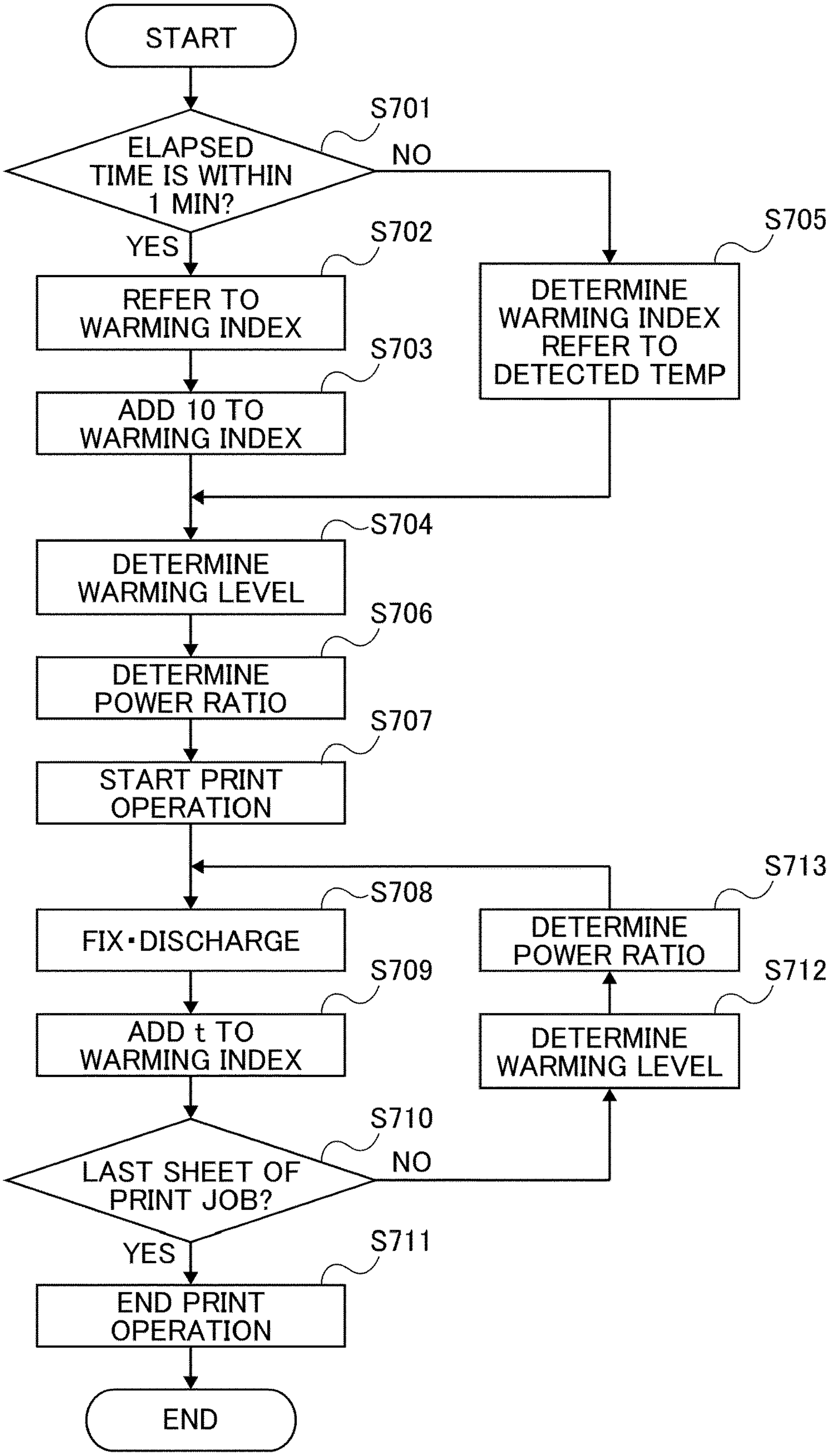

FIG. 7 is a flowchart illustrating a calculation process of a warming index.

Figure 8:
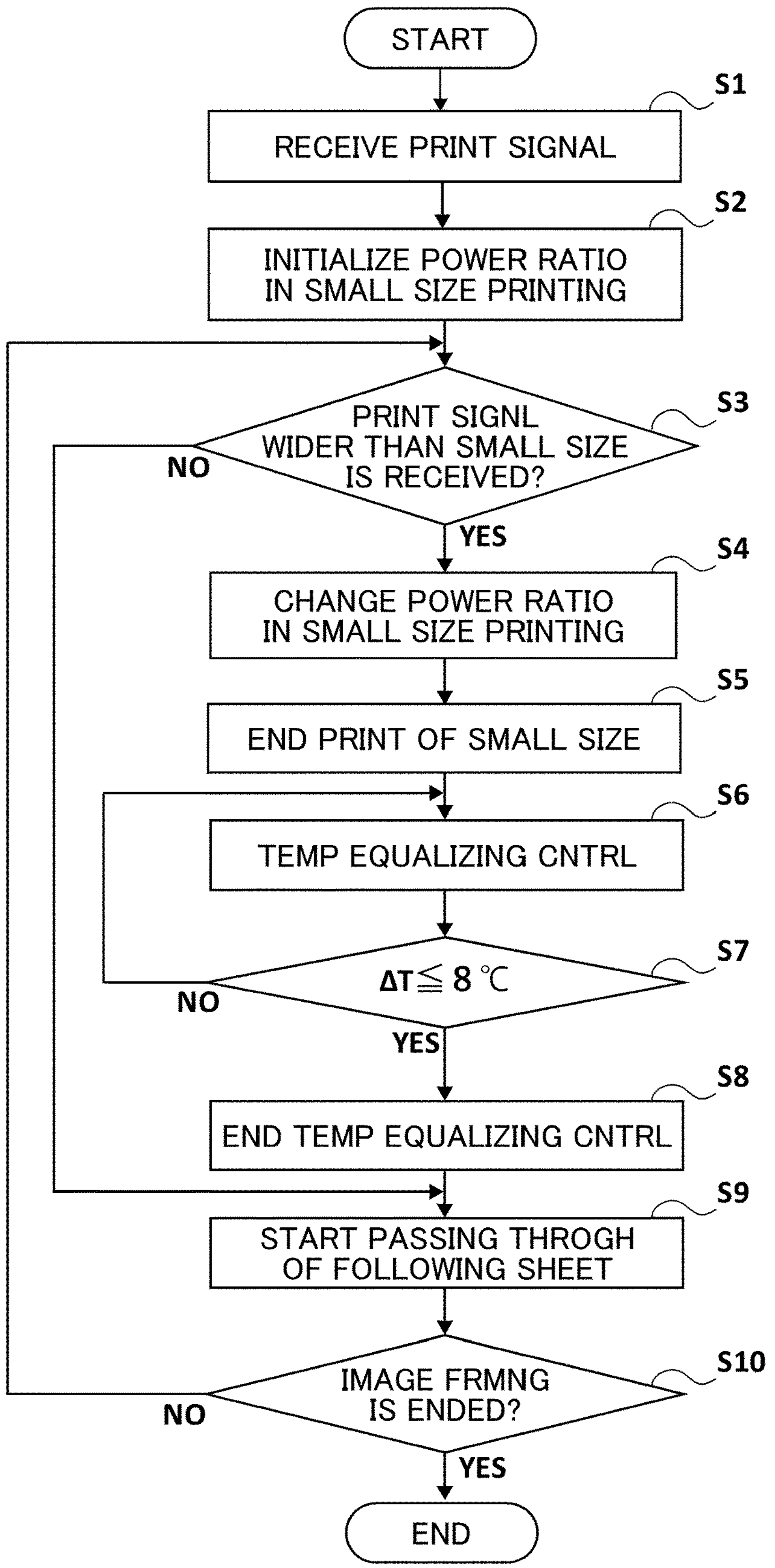

FIG. 8 is a flowchart illustrating heater processing in a first embodiment.

Figure 9:
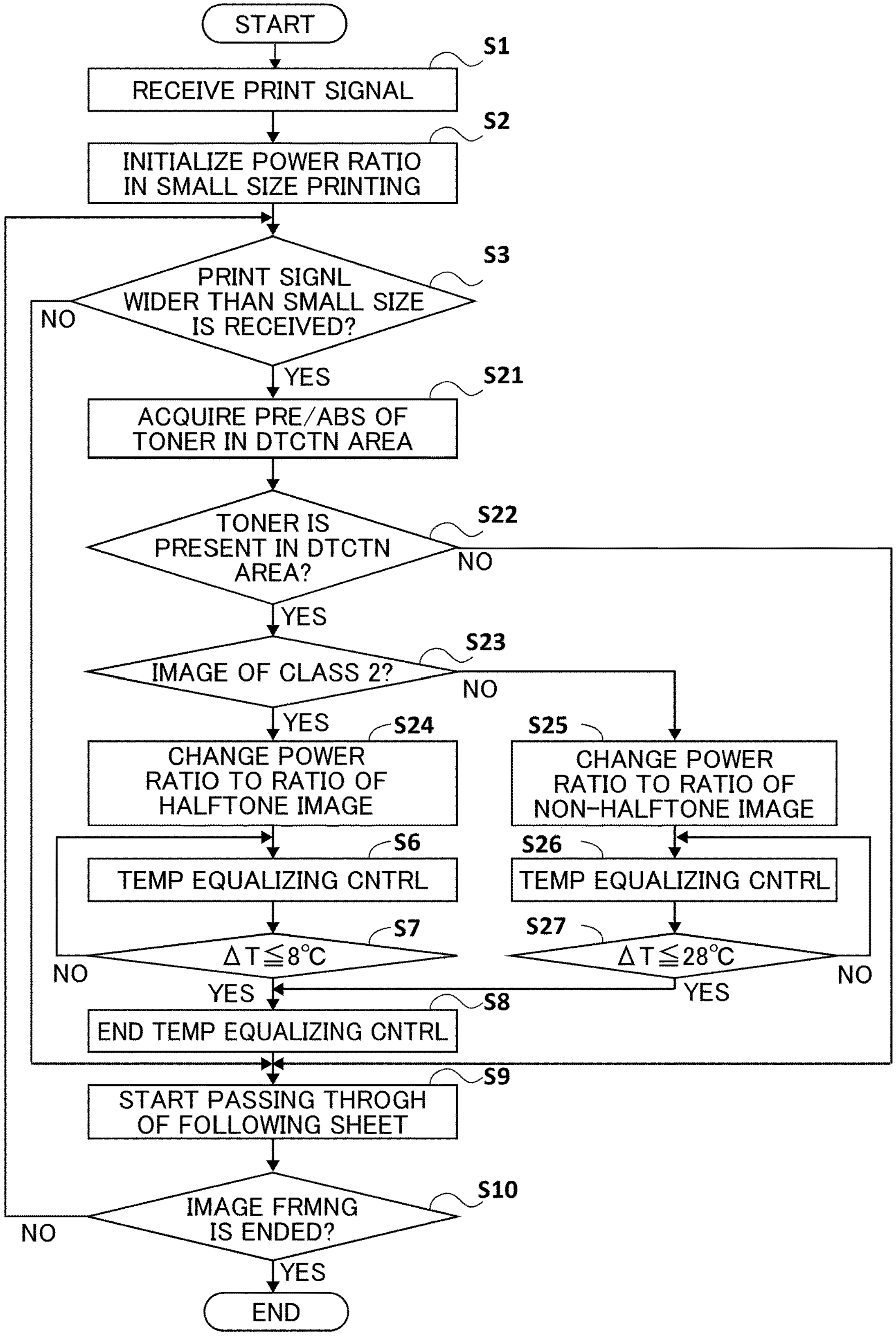

FIG. 9 is a flowchart illustrating heater processing in a second embodiment.

Figure 10:
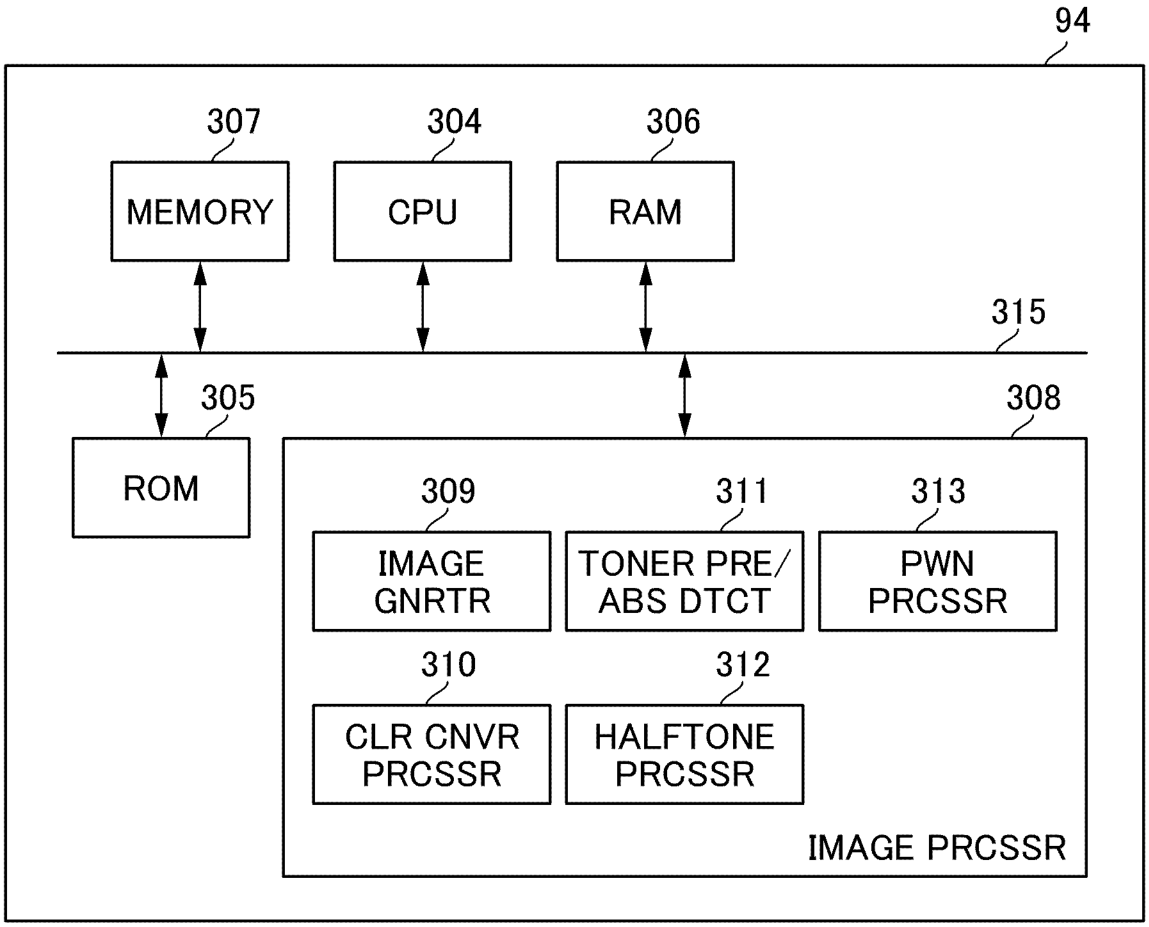

FIG. 10 is a control block view illustrating a control system which detects toner presence/absence.

Figure 11:
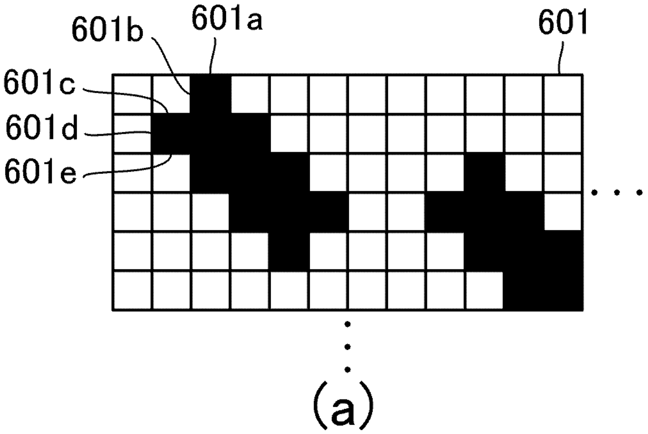
Figure 11:
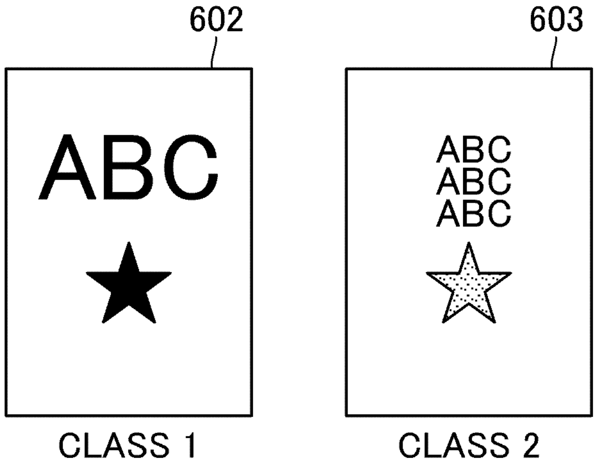

FIG. 11 is a figure to describe image classification, with part (a) showing a portion of data, and part (b) showing images of Class 1 and Class 2.

DESCRIPTION OF THE EMBODIMENTS

In the following, embodiments of the present invention will be specifically described with reference to Figures. In the following embodiments, passing recording paper through a fixing nip portion is referred to as passing paper. Further, in an area in which the heat generating member is generating heat, an area in which recording paper is not passing through is referred to as a non-passing through area (or a non-passing portion), and an area in which recording paper is passing through is referred to as a passing through area (or a passing portion). Furthermore, a phenomenon in which the temperature of the non-passing through area becomes higher than the passing through area is referred to as a non-passing portion temperature rise.

Embodiment 1

[Image Forming Apparatus]

Figure 1:
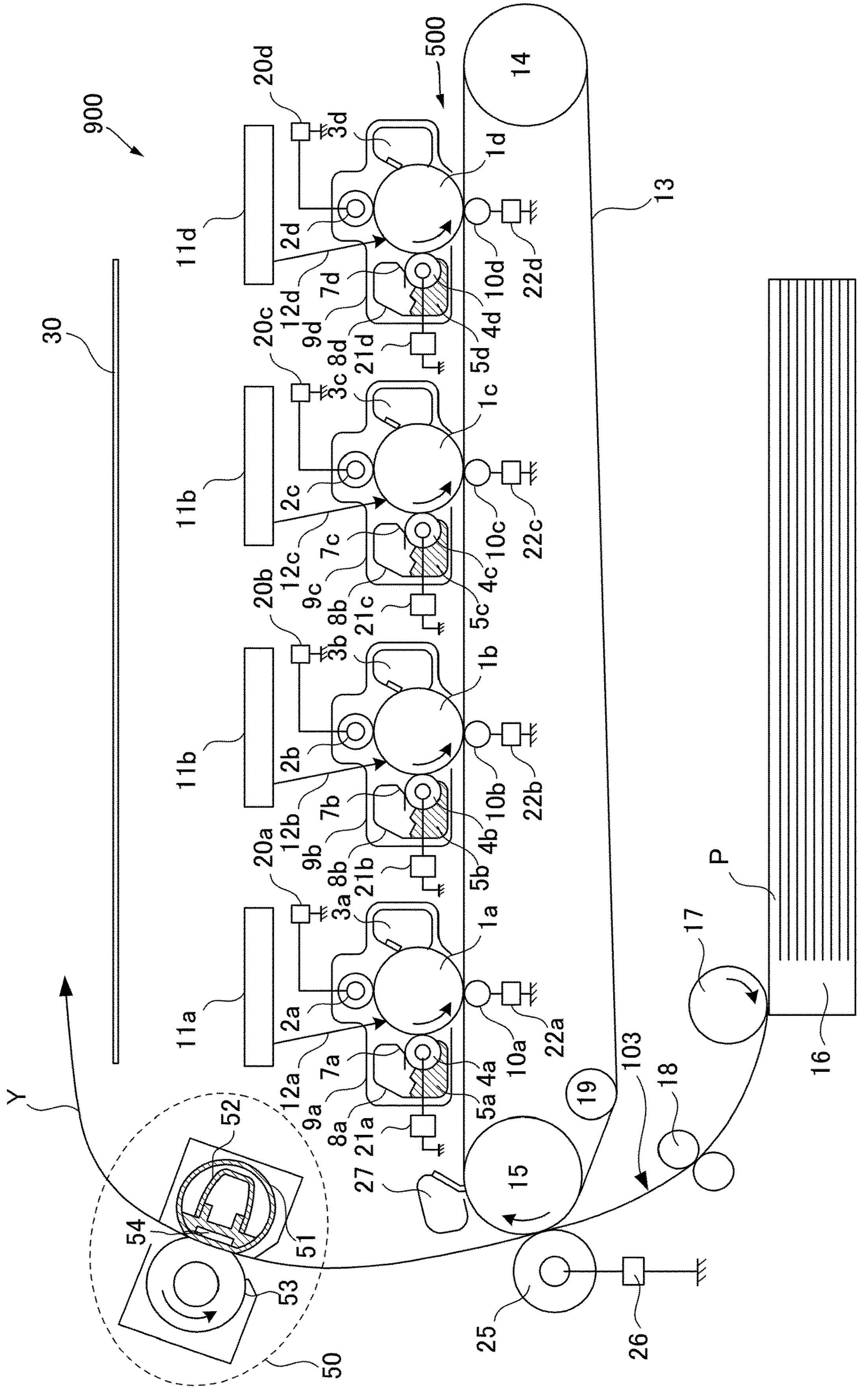
FIG. 1 is a schematic view showing a configuration of an image forming apparatus of the present embodiment.

An image forming apparatus 900 will be described using FIG. 1. In FIG. 1, an inline color image forming apparatus is shown as an example. Using FIG. 1, an operation of an electrographic color image forming apparatus will be described. Incidentally, a first station is a station for yellow (Y) toner image formation, and a second station is a station for magenta (M) toner image formation. Further, a third station is a station for cyan (C) toner image formation, and a fourth station is a station for black (K) toner image formation.

A photosensitive drum 1*a* as an image bearing member at the first station is an OPC photosensitive drum. The photosensitive drum 1*a* is formed by laminating a plurality of functional organic materials such as a carrier generation layer which generates a charge by exposure on a metal cylinder, a charge transport layer which transports the generated charge etc., and the outermost layer has a low electrical conductivity and is substantially insulating. A charging roller 2*a* is contacted by the photosensitive drum 1*a* and rotates together with the photosensitive drum 1*a* to uniformly charge the surface of the photosensitive drum 1*a* while being driven to rotate. The charging roller 2*a* is applied with a voltage superposing an AC or DC voltage, and the photosensitive drum 1*a* is charged by a discharge generated in a small air gap on the upstream and downstream sides in the rotation direction from the contact nip portion between the charging roller 2*a* and the surface of the photosensitive drum 1*a*. A cleaning unit 3*a* is a unit which cleans toner remaining on the photosensitive drum 1*a* after transfer, which is described below. A developing unit 8*a* includes a developing roller 4*a* and a developer coating blade 7*a*. The photosensitive drum 1*a*, the charging roller 2*a*, the cleaning unit 3*a*, and the developing unit 8*a* comprise an integrated process cartridge 9*a* which is detachable from the image forming apparatus 900.

An exposure device 11*a* is comprised by a scanner unit or an LED (light emitting diodes) array which scans a laser light with a polygon mirror, and irradiates a scanning beam 12*a* which is modulated based on an image signal onto the photosensitive drum 1*a*. Further, the charging roller 2*a* is connected to a charging high voltage power source 20*a* which is a voltage supply means to the charging roller 2*a*. The developing roller 4*a* is connected to a developing high voltage power source 21*a* which is a voltage supply means to the developing roller 4*a*. A primary transfer roller 10*a* is connected to a primary transfer high voltage power source 22*a* which is a voltage supply means to the primary transfer roller 10*a*. The above is the configuration of the first station, and the second, third, and fourth stations have the same configuration. With respect to the other stations, parts having the same functions as those of the first station are designated by the same reference numerals, and the subscripts of the reference numerals are denoted by b, c, and d for each station.

Incidentally, in the following description, the subscripts a, b, c, and d will be omitted unless a specific station is described.

An intermediary transfer belt 13 is supported by three rollers, a secondary transfer counter roller 15, a tension roller 14, and an auxiliary roller 19 as stretching members of the intermediary transfer belt 13. Only the tension roller 14 is applied with a force in a direction in which the intermediary transfer belt 13 is stretched by a spring so that an appropriate tension force is maintained on the intermediary transfer belt 13. The secondary transfer counter roller 15 is rotated by receiving a rotatable drive from a main motor (not shown), and the intermediary transfer belt 13 wound around the outer periphery is rotated. The intermediary transfer belt 13 moves at approximately the same speed in a forward direction (for example, rotating in a clockwise direction in FIG. 1) with respect to the photosensitive drums 1*a* to 1*d* (for example, rotating in a counterclockwise direction in FIG. 1). Further, the intermediary transfer belt 13 rotates in the direction of the arrow (clockwise direction), and the primary transfer rollers 10 are positioned on the opposite side from the photosensitive drums 1 sandwiching the intermediary transfer belt 13, and are driven to rotate by the movement of the intermediary transfer belt 13. A primary transfer position is a position where the photosensitive drums 1 contact the primary transfer rollers 10 sandwiching the intermediary transfer belt 13. The auxiliary roller 19, the tension roller 14, and the secondary transfer counter roller 15 are electrically grounded. Incidentally, the primary transfer rollers 10*b* to 10*d* of the second to fourth stations have the same configuration as the primary transfer roller 10*a* of the first station. As such, descriptions will be omitted. In the case of this embodiment, the first to fourth stations, the intermediary transfer belt 13, the primary transfer rollers 10, the tension roller 14, the auxiliary roller 19, and the secondary transfer counter roller 15 comprise an image forming unit 500 as an image forming portion capable of forming a toner image on a sheet P.

Next, an image forming operation of the image forming apparatus 900 will be described. When the image forming apparatus 900 receives a print command in the standby state, the image forming apparatus 900 starts the image forming operation. The photosensitive drums 1, the intermediary transfer belt 13 etc. start rotating in the direction of the arrow at a predetermined process speed by the main motor (not shown). The photosensitive drum 1*a* is uniformly charged by the charging roller 2*a* to which a voltage is applied by the charging high voltage power source 20*a*, and subsequently, an electrostatic latent image according to image information (also referred to as image data) is formed by the scanning beam 12*a* irradiated from the exposure device 11*a*. A toner 5*a* in the developing unit 8*a* is negatively charged by the developer coating blade 7*a* and applied to the developing roller 4*a*. Then, a predetermined developing voltage is supplied to the developing roller 4*a* from the developing high voltage power source 21*a*. When the photosensitive drum 1*a* rotates and the electrostatic latent image formed on the photosensitive drum 1*a* reaches the developing roller 4*a*, the electrostatic latent image is visualized by the adhesion of negative polarity toner, and a toner image of a first color (for example, Y (yellow)) is formed on the photosensitive drum 1*a*.

Stations (process cartridges 9*b* to 9*d*) of other colors, M (magenta), C (cyan), and K (black) also operate in the same manner. Electrostatic latent images due to exposure are formed on the photosensitive drums 1*a* to 1*d* while delaying the writing signal from a controller (not shown) at a fixed timing according to a distance between the primary transfer position of each color. A DC high voltage having a polarity opposite to that of the toner is applied to each of the primary transfer rollers 10*a* to 10*d*. By the above steps, the toner images are sequentially transferred to the intermediary transfer belt 13 (hereinafter referred to as primary transfer), forming multiple toner images on the intermediary transfer belt 13.

After that, the sheet P, which is the recording material loaded on a cassette 16, is conveyed along a conveyance path Y in accordance with the image formation of the toner images. Specifically, the sheet P is fed (picked up) by a paper feed roller 17 which is rotationally driven by a paper feed solenoid (not shown). The fed sheet P is conveyed to the registration roller 18 by a conveyance roller. A registration sensor 103 is positioned downstream of the registration roller 18. When the leading end of the sheet P arrives, the registration sensor 103 detects the "presence" of the sheet P, and when the trailing end of the sheet P passes, the registration sensor 103 detects the "absence" of the sheet P.

The sheet P is conveyed by the registration roller 18 to a nip portion which is a contact portion between the intermediary transfer belt 13 and a secondary transfer roller 25 in synchronization with the toner images on the intermediary transfer belt 13. A voltage having a polarity opposite to that of the toner is applied to the secondary transfer roller 25 by a secondary transfer high voltage power source 26, and the four-color multiple toner images carried on the intermediary transfer belt 13 are collectively transferred (hereinafter referred to as secondary transfer) onto the sheet P (onto the recording material). The members that contribute (for example, the photosensitive drums 1 etc.) until the unfixed toner images are formed on the sheet P function as image forming means.

On the other hand, toner remaining on the intermediary transfer belt 13 after the secondary transfer has ended is cleaned by a cleaning unit 27. The sheet P after which the secondary transfer has ended is conveyed to a fixing device 50 as a fixing portion, and the sheet P with the toner images fixed thereon is discharged to a discharge tray 30 as an image formed product (print, copy). The time from the start of the image forming operation until the arrival of the sheet P at the fixing nip portion is, for example, approximately 9 seconds, and the time until the discharge of the sheet P is, for example, 12 seconds. A fixing film 51, a nip forming member 52, a pressure roller 53, and a heater 54 of the fixing device 50 will be described later.

A printing mode for continuously printing images on a plurality of sheets P is hereinafter referred to as continuous printing or a continuous image forming job. In continuous printing, a space between a trailing edge of a sheet P (hereinafter referred to as preceding sheet) on which printing is performed in advance and a leading edge of a succeeding sheet P (hereinafter referred to as succeeding sheet) on which printing is performed subsequent to the preceding sheet is referred to as a paper interval. In the present embodiment, in continuous printing of an A4-size sheet, the toner images on the intermediary transfer belt 13 and the sheet P are synchronously conveyed, and printing is performed so that the distance of the paper interval is, for example, 30 mm. The image forming apparatus 900 of the present embodiment is a central reference device which performs a printing operation by aligning the central positions in a direction (longitudinal direction, which will be described later) perpendicular to the conveyance direction of each member and the sheet P. Therefore, whether the printing operation is performed on a sheet P having a large length in the direction perpendicular to the conveyance direction, or the printing operation is performed on a sheet P having a small length in the direction perpendicular to the conveyance direction, the central position of each sheet P is aligned.

[Control Block View of Image Forming Apparatus]

Figure 2:
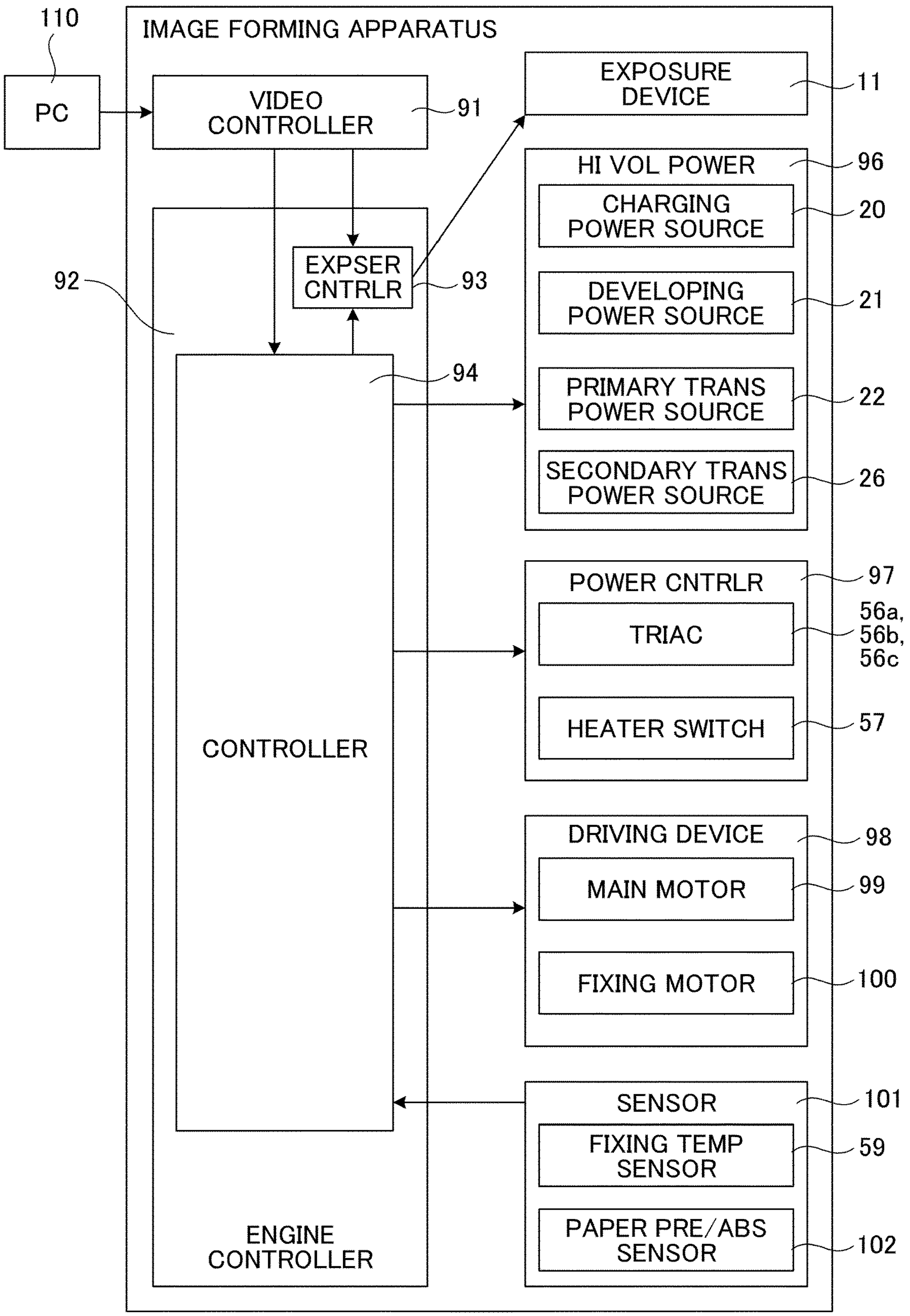
FIG. 2 is a control block view of the image forming apparatus.

FIG. 2 is a block view explaining the operation of the image forming apparatus 900, and the printing operation of the image forming apparatus 900 will be described with reference to this figure. A PC 110, which is a host computer, is responsible for outputting a print command to a video controller 91 inside the image forming apparatus 900 and transferring the image data of the print image to the video controller 91.

The video controller 91 converts the image data inputted from the PC 110 into exposure data and transfers the image data to an exposure control device 93 in an engine controller 92. The exposure control device 93 is controlled by a control portion 94 to turn on/off the exposure data and control the exposure devices 11. The size of the exposure data is determined by the image size. Upon receiving the print command, the control portion 94 starts the image forming sequence.

The engine controller 92 is equipped with the control portion 94 and performs a preprogrammed operation. A high voltage power source 96 is comprised by the charging high voltage power sources 20, the developing high voltage power sources 21, the primary transfer high voltage power sources 22, and the secondary transfer high voltage power source 26 described above. Further, a power control portion 97 includes bidirectional thyristors (hereinafter referred to as triacs) 56*a*, 56*b*, and 56*c*. The power control portion 97 also includes a heating element switching device 57 which switches heat generating members 54*b*2 and 54*b*3 by switching a power supply path which supplies electric power. The power control portion 97 selects a heat generating member which generates heat in the fixing device 50 and determines the amount of electric power to be supplied. In the present embodiment, the heating element switching device 57 is, for example, an a-contact relay.

Further, a drive device 98 is comprised by a main motor 99, a fixing motor 100 etc. Further, a sensor 101 is comprised by a fixing temperature sensor 59 which detects the temperature of the fixing device 50, a paper presence/absence sensor 102 which includes a flag and detects the presence/absence of the sheet P, etc., and the detection result of the sensor 101 is transmitted to the control portion 94. Further, the registration sensor 103 may be included in the paper presence/absence sensor 102. The control portion 94 obtains the detection result of the sensor 101 in the image forming apparatus and controls the exposure devices 11, the high voltage power source 96, the power control portion 97, and the drive device 98. As a result, the control portion 94 forms an electrostatic latent image, transfers the developed toner image, fixes the toner image on the sheet P, etc., and controls the image formation steps of printing exposure data as toner image on the sheet P. Incidentally, the image forming apparatus to which the present invention is applied is not limited to the image forming apparatus 900 having the configuration described with reference to FIG. 1, and can be any image forming apparatus which is capable of printing sheets P having different widths and is provided with the fixing device 50 including the heater 54, which will be described later.

[Fixing Device]

Figure 3:
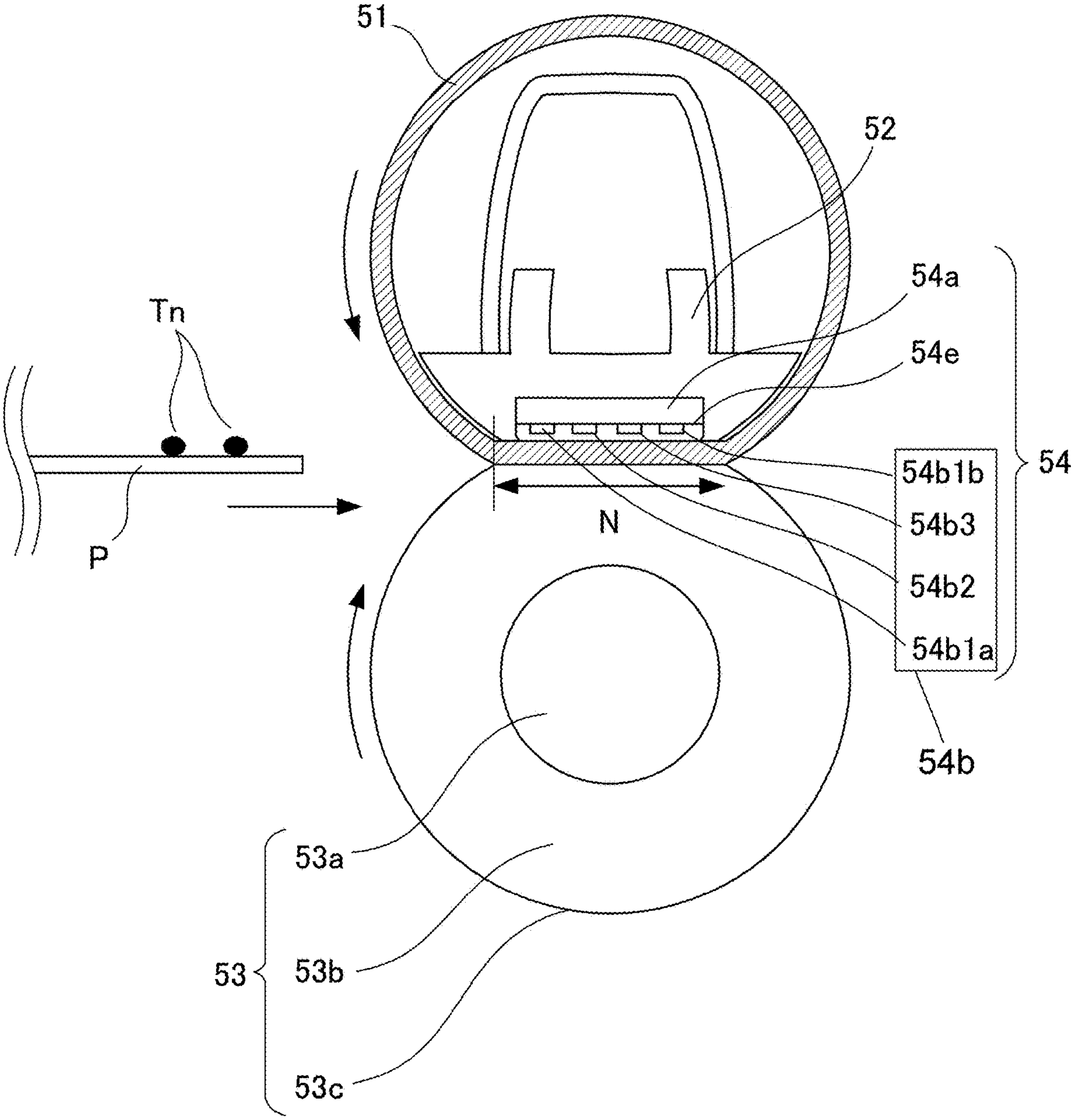
FIG. 3 is a sectional view showing a fixing device.

Next, the fixing device 50 will be described with reference to FIG. 3. Here, the longitudinal direction is the rotational axis direction of the pressure roller 53 which is substantially perpendicular to the conveyance direction of the sheet P, which will be described later. Further, the length of the sheet P in the direction substantially perpendicular to the conveyance direction (longitudinal direction) and the length of the heat generating members are referred to as widths. FIG. 3 is a schematic cross-sectional view of the fixing device 50. Further, part (a) of FIG. 4 is a schematic view of the heater 54, part (b) of FIG. 4 is a schematic cross-sectional view of the heater 54, and FIG. 5 is a schematic circuit view of the power control portion 97 of the heater 54 of the fixing device 50. Further, part (b) of FIG. 4 is a center line in the longitudinal direction of the heat generating members 54*b*1*a*, 54*b*1*b*, 54*b*2, and 54*b*3, and is a figure showing a cross section of the heater 54 on the center line (one-dot chain line in part (a) of FIG. 4) in the longitudinal direction of the sheet P conveyed to the fixing device 50. Hereinafter, a line a is referred to as a reference line a.

The sheet P holding an unfixed toner image Tn from the left side of FIG. 3 is heated while being conveyed from the left to the right in the figure at a fixing nip portion N so that the toner image Tn is fixed to the sheet P. The fixing device 50 in the present embodiment is comprised by the cylindrical fixing film 51 as a first rotatable member, the nip forming member 52 which holds the fixing film 51, the pressure roller 53 which forms the fixing nip portion N together with the fixing film 51, and the sheet P which is configured to heat the heater 54.

In the present embodiment, as a base layer for the fixing film 51, polyimide, for example, is used. An elastic layer made of silicone rubber and a detachable layer made of PFA are used on the base layer. The inner diameter of the fixing film 51 is 18 mm, and the outer peripheral length of the fixing film 51 is approximately 58 mm.

Grease is applied to the inner surface of the fixing film 51 in order to reduce the frictional force generated between the nip forming member 52, the heater 54, and the fixing film 51 caused by the rotation of the fixing film 51. Incidentally, a thin-walled fixing film 51 is shown as an example here; however, the fixing film 51 is not limited to this, and, for example, a fixing belt formed to be endless by a resin such as rubber etc. can be used.

The nip forming member 52 plays a role of guiding the fixing film 51 from the inside and forming the fixing nip portion N between the nip forming member 52 and the pressure roller 53 via the fixing film 51. The nip forming member 52 is a member having rigidity, heat resistance, and heat insulating properties, and is formed with a liquid crystal polymer etc. The fixing film 51 is fitted onto the nip forming member 52. The pressure roller 53 as a second rotatable body is comprised by a metal core 53*a*, an elastic layer 53*b*, and a detachable layer 53*c*. Both ends of the pressure roller 53 are rotatably held, and the pressure roller 53 is rotationally driven by the fixing motor 100 (see FIG. 2). Further, the fixing film 51 is driven to rotate by the rotation of the pressure roller 53. The heater 54 is held by the nip forming member 52 and is in contact with the inner surface of the fixing film 51. A substrate 54*a*, the heat generating members 54*b*1*a* (54*b*1), 54*b*1*b* (54*b*1), 54*b*2, and 54*b*3, a protective glass layer 54*e*, and the fixing temperature sensor 59 will be described later.

The heater 54 will be described in detail with reference to part (a) of FIG. 4. The heater 54 includes the substrate 54*a*, the heat generating members 54*b*1*a*, 54*b*1*b*, 54*b*2, and 54*b*3, a conductor 54*c*, contacts 54*d*1 to 54*d*4, and the protective glass layer 54*e*. Hereinafter, the heat generating members 54*b*1*a*, 54*b*1*b*, 54*b*2, and 54*b*3 may be collectively referred to as a heat generating member 54*b*. Further, the heat generating members 54*b*1*a* and 54*b*1*b* having approximately the same length in the longitudinal direction may be collectively referred to as the heat generating member 54*b*1. The substrate 54*a* uses alumina (Al2O3) which is a ceramic.

Alumina (Al2O3), aluminum nitride (AlN), zirconia (ZrO2), and silicon carbide (SiC) etc. are widely known as ceramic substrates. Among them, alumina (Al2O3) is inexpensive and industrially readily available. Further, a metal having excellent strength may be used for the substrate 54*a*, and stainless steel (SUS) is preferably used as a metal substrate due to its excellence in both price and strength. Regardless of whether a ceramic substrate or a metal substrate is used as the substrate 54*a*, in a case in which the substrate has conductivity, an insulating layer can be provided and used. The heat generating members 54*b*1*a*, 54*b*1*b*, 54*b*2, and 54*b*3, the conductor 54*c*, and the contacts 54*d*1 to 54*d*4 are formed on the substrate 54*a*. Also, the protective glass layer 54*e* is formed on the above to ensure insulation between the heat generating members 54*b*1*a*, 54*b*1*b*, 54*b*2, and 54*b*3 and the fixing film 51.

The heat generating member 54*b* has different lengths (hereinafter also referred to as sizes) in the longitudinal direction. The heat generating members 54*b*1*a* and 54*b*1*b* as first heat generating members have a length in the longitudinal direction which is a first length, "length L1=222 mm". The heat generating member 54*b*2 as a second heat generating member has a length in the longitudinal direction which is a second length, "length L2=188 mm", and the heat generating member 54*b*3 as a third heat generating member has a length in the longitudinal direction which is a third length, "length L3=154 mm". The relationship between the lengths L1, L2, and L3 is "L1>L2>L3".

Further, the largest paper width (hereinafter referred to as maximum paper width) of the sheet P which can be used in the image forming apparatus 900 of the present embodiment is 216 mm, and the smallest paper width (hereinafter referred to as minimum paper width) is 76 mm. Therefore, the length L1 is a length which allows the heat generating member 54*b* 1 to fix the image size (206 mm) of the maximum paper width (216 mm). The heat generating member 54*b*1 is electrically connected via the conductor 54*c* to the contact 54*d*2, which is a second contact, and the contact 54*d*4, which is a fourth contact, and the heat generating member 54*b*2 is electrically connected via the conductor 54*c* to the contacts 54*d*2 and 54*d*3. The heat generating member 54*b*3 is electrically connected via the conductor 54*c* to the contact 54*d*1, which is a first contact, and the contact 54*d*3, which is a third contact. Here, the heat generating members 54*b*1*a* and 54*b*1*b* have the same length, and are always used at approximately the same time. The heat generating member 54*b*1*a* is provided at one end of the substrate 54*a* in the lateral direction, and the heat generating member 54*b*1*b* is provided at the other end of the substrate 54*a* in the lateral direction. The heat generating members 54*b*2 and 54*b*3 are provided symmetrically with respect to the center in the lateral direction between the heat generating members 54*b*1*a* and 54*b*2*b* in the lateral direction of the substrate 54*a*. Incidentally, in the present embodiment, the heat generating members 54*b*1 (54*b*1*a* and 54*b*1*b*), 54*b*2, and 54*b*3 have the same maximum heat generation amount.

The fixing temperature sensor 59 is a thermistor. The configuration of the fixing temperature sensor 59 will be described with reference to part (b) of FIG. 4. The fixing temperature sensor 59, which is a temperature detecting means, is comprised by a main thermistor element 59*a*, a holder 59*b*, a ceramic paper 59*c*, and an insulating resin sheet 59*d*. The ceramic paper 59*c* plays a role of inhibiting heat conduction between the holder 59*b* and the main thermistor element 59*a*. The insulating resin sheet 59*d* plays a role of physically and electrically protecting the main thermistor element 59*a*. The main thermistor element 59*a* has an output value which changes according to the temperature of the heater 54, and is connected to the control portion 94 by a jumet line (not shown) and wiring. The main thermistor element 59*a* detects the temperature of the heater 54 and outputs the detection result to the control portion 94.

The fixing temperature sensor 59 is located on the surface opposite to the protective glass layer 54*e* with respect to the substrate 54*a* and is installed at the position of the reference line a (position corresponding to the center) in the longitudinal direction of the heat generating member 54*b*, and is in contact with the substrate 54*a*. The control portion 94 controls the temperature during the fixing process based on the detection result of the fixing temperature sensor 59. The above is a description of the configuration of the fixing temperature sensor 59, which is the main thermistor.

[Soaking Member]

As described above, the fixing film 51 may partially raise in temperature, causing the temperature distribution in the widthwise direction to be non-uniform. Accordingly, a metal plate close to the shape of the heater 54 can be installed on the reverse side of the heater 54, or between the heater 54 and the fixing film 51 as a so-called soaking member to relax the temperature distribution. The soaking member is formed by a member with high heat conductivity, for example, an aluminum plate or a copper plate.

[Power Control Portion]

FIG. 5 is a schematic view of the power control circuit of the heater 54 and the power control portion 97 of the fixing device 50.

The power control circuit of the fixing device 50 is comprised by the heat generating members 54*b*1, 54*b*2, and 54*b*3, an AC power source 55, the triacs 56*a*, 56*b* and 56*c*, and the heating element switching device 57 The contact 54*d*1 is connected to the triac 56*c*, and is connected to a first pole of the AC power source 55 via the triac 56*c*. The contact 54*d*2 is connected to the heating element switching device 57 and a second pole of the AC power source 55. The contact 54*d*3 is connected to the triac 56*b* and the heating element switching device 57, and is connected to the first pole of the AC power source 55 via the triac 56*b*. The contact 54*d*4 is connected to the triac 56*a*, and is connected to the first pole of the AC power source 55 via the triac 56*a*. Incidentally, since the heat generating member 54*b*, which generates heat by switching the power supply path by the heating element switching device 57, is switched, switching the power supply path is also referred to as switching the heat generating member 54*b*. In the present embodiment, the heating element switching device 57 is specifically an electromagnetic relay having an a-contact configuration.

The triacs 56*a*, 56*b*, and 56*c* are triacs which supply electric power to or cut off the power supply from the AC power source 55 to the heat generating members 54*b*1, 54*b*2, and 54*b*3 by being conductive or non-conductive. The control portion 94 calculates the electric power required to bring the heater 54 to a predetermined temperature (target temperature required for fixing) based on the temperature information sent from the main thermistor element 59*a*, and instructs the triacs 56*a*, 56*b*, and 56*c* to be conductive or non-conductive. The heating element switching device 57, which is an electromagnetic relay, is either in a state in which the contacts 54*d*2 and 54*d*3 are connected, or a state in which the contacts 54*d*2 and 54*d*3 are disconnected by controlling the engine controller 92.

[Power Supply Path]

Next, a method of supplying electric power by alternately switching between the heat generating members 54*b*1 and 54*b*2, and the heat generating members 54*b*1 and 54*b*3 will be described. Parts (a) to (c) of FIG. 6 show three current paths (both electrical and power supply paths) to the heater 54 provided with the heat generating members 54*b*1, 54*b*2, and 54*b*3 of three different lengths, and the heat generating members 54*b*1 to 54*b*3. Incidentally, the current paths shown in parts (a) to (c) of FIG. 6 are only an example, and other current path configurations may be used.

(Power Supply to Heat Generating Member 54*b*1)

When electric power is supplied from the AC power source 55 to the heat generating member 54*b*1, the current flows through the route shown by a thick line in part (a) of FIG. 6. The fixing temperature sensor 59 (not shown in FIG. 6) detects the temperature of the heater 54, and the control portion 94 operates the triac 56*a* based on the detected temperature information so that the detection result of the fixing temperature sensor 59 becomes a predetermined temperature. As a result, the power supply to the heat generating member 54*b*1 is controlled. The power supply to the heat generating member 54*b*1 does not depend on the state of the triacs 56*b* and 56*c* nor the heating element switching device 57, which is an electromagnetic relay having the a-contact configuration That is, when supplying electric power to the heat generating member 54*b*1, the heating element switching device 57 may be in an open state or a short-circuited state. Incidentally, in part (a) of FIG. 6, the heating element switching device 57 is in an open state as an example.

(Power Supply to Heat Generating Member 54*b*2)

When electric power is supplied from the AC power source 55 to the heat generating member 54*b*2, the current flows along the route shown by the thick line in part (b) of FIG. 6. When supplying electric power to the heat generating member 54*b*2, the contacts of the heating element switching device 57, which is an electromagnetic relay having the a-contact configuration, is set to the open state. Since the contact impedance of the heating element switching device 57 having the a-contact configuration in the open state is sufficiently larger than that of the heat generating member 54*b*2, almost no current flows through the heating element switching device 57 having the a-contact configuration, and only the heat generating member 54*b*2 can be heated. Electric power supplied to the heat generating member 54*b*2 is controlled by the triac 56*b*.

(Power Supply to Heat Generating Member 54*b*3)

When electric power is supplied from the AC power source 55 to the heat generating member 54*b*3, the current flows along the route shown by the thick line in part (c) of FIG. 6. When electric power is supplied to the heat generating member 54*b*3, almost all the current flows through the heat generating member 54*b*3 by setting the contacts of the heating element switching device 57 having the a-contact configuration to the short-circuited state. Since the contact impedance of the heating element switching device 57 having the a-contact configuration in the short-circuited state is sufficiently smaller than that of the heat generating member 54*b*2, almost no current flows through the heat generating member 54*b*2, and only the heat generating member 54*b*3 can be heated. The electric power supplied to the heat generating member 54*b*3 is controlled by the triac 56*c*.

[Switching Power Supply Paths]

To switch between the power supply path to the heat generating member 54*b*1 (part (a) of FIG. 6) and the power supply path to the heat generating member 54*b*2 (part (b) of FIG. 6), the contacts of the heating element switching device 57 having the a-contact configuration are set to an open state in advance. As a result, the triacs 56*a* and 56*b* can be independently controlled only by their non-contact switches. Therefore, the state transition between the power supply path (part (a) of FIG. 6) and the power supply path (part (b) of FIG. 6) can be done seamlessly, and the power supply path (part (b) of FIG. 6) can be used together with the power supply path (part (a) of FIG. 6).

The same applies to the power supply path to the heat generating member 54*b*1 (part (a) of FIG. 6) and the power supply path to the heat generating member 54*b*3 (part (c) of FIG. 6). As described above, in the power supply path (part (a) of FIG. 6), the heating element switching device 57 may be in an open state or a short-circuited state. For this reason, if the contacts of the heating element switching device 57 having the a-contact configuration are short-circuited in advance, the following can be achieved. That is, the state transition between the power supply path (part (a) of FIG. 6) and the power supply path (part (c) of FIG. 6) can be done seamlessly, and the power supply path (part (c) of FIG. 6) can be used together with the power supply path (part (a) of FIG. 6).

On the other hand, when switching between the power supply path of the heat generating member 54*b*2 (part (b) of FIG. 6) and the power supply path of the heat generating member 54*b*3 (part (c) of FIG. 6), the state of the heating element switching device 57 having the a-contact configuration must be switched. For this reason, the power supply path to the heat generating member 54*b*3 (part (c) of FIG. 6) cannot be used together with the power supply path (part (b) of FIG. 6). That is, only one of the power supply path (part (b) of FIG. 6) and the power supply path (part (c) of FIG. 6) can be used, and these paths are exclusive.

However, if a transition between the power supply path (part (b) of FIG. 6) and the power supply path (part (c) of FIG. 6) is desired, the transition can be carried out as follows. For example, the state transition can be carried out such that the power supply path (part (b) of FIG. 6)→the power supply path (part (a) of FIG. 6)→the power supply path (part (c) of FIG. 6), or such that the power supply path (part (c) of FIG. 6)→the power supply path (part (a) of FIG. 6)→the power supply path (part (b) of FIG. 6). In either case, the power supply path (part (a) of FIG. 6) may be routed between the power supply path (part (b) of FIG. 6) and the power supply path (part (c) of FIG. 6). While the power supply path (part (a) of FIG. 6) is being used, in other words, while electric power is being supplied to the heat generating member 54*b*1, the state of the heating element switching device 57 having the a-contact configuration is switched to the short-circuited state from the open state, or from the short-circuited state to the open state. As a result, a situation in which power supply to the heater 54 is stopped and the required amount of heat cannot be supplied to the sheet P in order to wait for the state of the contacts of the heating element switching device 57 having the a-contact configuration to stabilize can be prevented.

[Selection of Heat Generating Member According to Paper Size]

Table 1 will be used to describe the selection of the heat generating member when printing on large-size paper and when printing on small-size paper.

TABLE 1

| | Case 1 Large-size printing | Case 2 Small-size printing 1 | Case 3 Small-size printing 2 |
|---|---|---|---|
| Paper width | 216 mm~182 mm | 182 mm~148 mm | 148 mm~76 mm |

TABLE 1-continued

| | Case 1 Large-size printing | Case 2 Small-size printing 1 | Case 3 Small-size printing 2 |
|---|---|---|---|
| Heat generating member | Heat generating member 54b1 | Heat generating members 54b1 and 54b2 | Heat generating members 54b1 and 54b3 |

Table 1 shows the width (paper width) of the sheet P in each case and the selected heat generating member. The second column shows the paper width and the selected heat generating member for large-size printing as Case 1, and the third column shows the paper width and the selected heat generating member for a small-size printing 1 as Case 2. The fourth column shows the paper width and the selected heat generating member for a small-size printing 2 as Case 3. In the present embodiment, a sheet P specified by the user having a width larger than 182 mm and equal to or less than 216 mm is referred to as large-size paper, and printing on large-size paper is referred to as large-size printing, which selects and controls the heat generating member 54*b*. In large-size printing in Case 1 shown in Table 1, only the heat generating member 54*b*1 is heated.

A sheet P specified by the user having a width larger than 148 mm and equal to or less than 182 mm is referred to as a small-size paper 1, and printing on the small-size paper 1 is referred to as the small-size printing 1, which heats the heat generating member 54*b*2 together with the heat generating member 54*b*1. Further, a sheet P specified by the user having a width equal to or larger than 76 mm and equal to or less than 148 mm is referred to as a small-size paper 2, which heats the heat generating member 54*b*3 together with the heat generating member 54*b*1.

[Warming Index]

In small-size printing (Case 2 and Case 3), the temperature of the full-width heat generating member 54*b*1 and the narrow-width heat generating member 54*b*2 or 54*b*3 is controlled as follows. That is, the temperature is controlled so that the detection temperature of the fixing temperature sensor 59 becomes a predetermined target temperature under a power ratio determined in advance according to a warming level of the fixing device 50. In the present embodiment, a configuration in which the heat generating member 54*b*2 or 54*b*3 is heated together with the heat generating member 54*b*1 will be described.

However, the configuration of the heat generating members 54*b*1 and 54*b*2, or the heat generating members 54*b*1 and 54*b*3 may be such that the heat generating members alternately and exclusively generate heat.

The warming level of the fixing device 50 is an index indicating the degree of temperature rise (heating state, degree of temperature rise) of the fixing device 50. A method of setting the warming level will be described with reference to Table 2. The warming level is, for example, divided into five stages, from a warming level 1 which indicates a state in which the fixing device 50 is cold to a warming level 5 which can be regarded as being thermally saturated. A warming index is assigned to each stage of the warming level. The warming level is determined by adding the warming index according to the print mode, and when the warming index exceeds 20, the process shifts to the next warming level.

TABLE 2

| Warming level | 1 | 2 | 3 | 4 | 5 |
|---|---|---|---|---|---|
| Warming index | 0~19 | 20~39 | 40~59 | 60~79 | 80~ |
| Temperature detection threshold | 0° C.~ | 60° C.~ | 80° C.~ | 100° C.~ | 130° C.~ |

In Table 2, the warming level is shown in the first row, the warming index is shown in the second row, and the threshold value of temperature detection (temperature detection threshold) is shown in the third row. The second column shows the warming index and the temperature detection threshold of a warming level 1, and the third column shows the warming index and the temperature detection threshold of a warming level 2. The fourth column shows the warming index and temperature detection threshold of a warming level 3, the fifth column shows the warming index and temperature detection threshold of a warming level 4, and the sixth column shows the warming index and temperature detection threshold of a warming level 5. For example, if the warming index determined by addition is 25, the warming level is 2, and the threshold value of temperature detection is 60° C. or higher.

[Warming Level Determination Process]

The method of determining the warming level will be described with reference to the flowchart in FIG. 7 which shows the process of determining the warming level. When the control portion 94 receives a print signal, the control portion 94 executes processes in step S701 and thereafter. The method of determining the warming level can be roughly divided into two methods according to the elapsed time from the immediately preceding print job.

In S701, the control portion 94 determines whether or not the elapsed time is within 1 minute from the end of the image formation job (hereinafter referred to as previous job) executed immediately before the printer receives the print signal. If the control portion 94 determines in S701 that the elapsed time is within 1 minute (YES in S701), the process proceeds to S702, and if the control portion 94 determines that the elapsed time exceeds 1 minute (NO in S701), the process proceeds to S705. In S702, the control portion 94 refers to the warming index at the time of the previous job, that is, the warming index immediately prior. Incidentally, for the warming index immediately prior, for example, it is assumed that the warming index obtained in the previous job is stored in a memory 95. In S703, the control portion 94 adds 10 to the warming index referred to in S702. In S704, the control portion 94 determines the warming level based on Table 2 from the warming index added by 10 in S703. For example, if the warming index added by 10 is 25, the control portion 94 determines the warming level to be 2 based on Table 2.

In S705, since time has elapsed from the previous job, the control portion 94 refers to the temperature detected by the fixing temperature sensor 59 and determines the warming index based on Table 2. In S704, the control portion 94 determines the warming level based on the warming index determined in S705 and Table 2. For example, if the temperature detected by the fixing temperature sensor 59 is 60° C., the control portion 94 determines the warming index, for example, to be 20, and the warming level to be 2, based on Table 2. The warming index added in S703 or determined in S705 is used in the processing of S709, which will be described later.

In S706, the control portion 94 determines the power ratio between the heat generating members 54*b*1 and 54*b*2, or the heat generating members **54*b*1 and 54*b*3 from the warming level determined in S704 by referring to a table. The table for determining the power ratio will be described later. In S707, the control portion 94 starts the print operation using the power ratio determined in S706. In S708, the control portion 94 prints on the number of sheets P specified by the print signal received, performs the fixing process on the sheets P, and ejects the sheets P. In S709, the control portion 94 adds 1 to the warming index each time 1 sheet is printed, in other words, each time 1 sheet P is passed through the fixing device 50. Incidentally, the control portion 94 stores the added warming index information, for example, in the memory 95**.

In S710, the control portion 94 determines whether or not the sheet P passed through the fixing device 50 is the last sheet P (last paper) in continuous printing of the instructed print job. If the control portion 94 determines in S710 that the sheet P is the last sheet P for continuous printing (YES in S710), the control portion 94 ends the printing operation in S711, and the process is terminated. If the control portion 94 determines in S710 that the sheet P is not the last sheet P for continuous printing (NO in S710), the process proceeds to S712. In S712, the control portion 94 determines the warming level in S709 based on the warming index added by 1 and Table 2. In S713, the control portion 94 determines the power ratio for the next printing (specifically, the fixing process) based on the warming level determined in S712 and the table described later, and returns the process to S708. In this way, in the case of continuous printing, addition of the warming index, determination of the warming level, determination of the power ratio, and fixing/discharging are repeated for each printing.

[Film Deformation]

Here, the reason for which the fixing process is performed even for small-size paper using the heat generating members **54*b*1 and 54*b*2 having long widths is to prevent deformation of the fixing film 51. The reason for the deformation of the fixing film 51 will be described in detail using the small-size printing 1** as an example.

If the fixing operation is performed using only the heat generating member **54*b*2 having a short width from the cold state of the fixing device 50, only the heat generating member 54*b*2 portion of the pressure roller 53 is heated. Since the non-passing portion remains at normal temperature, a temperature difference of 100° C. or more is generated between the passing portion and the non-passing portion. The heated portion of the pressure roller 53 expands thermally, increasing the outer diameter. If the outer diameter increases, the nip enlarges and the conveyance speed increases. As a result, while the conveyance speed of the heated portion increases, the portion outside the heat generating member 54*b*2 is not heated and the conveyance speed is unchanged, creating a speed difference. A twisting force is thereby applied to the fixing film 51 at the boundary between the passing portion and the non-passing portion, causes the fixing film 51 to deform. Therefore, in order to prevent deformation of the fixing film 51 as described above, the full-width heat generating member 54*b*1 needs to be lit. When the full-width heat generating member 54*b*1** is lit, the non-passing portion temperature rise may occur; however, the temperature difference in this case will not surpass 100° C.

Accordingly, in the small-size printings 1 and 2, the power ratio of the heat generating member **54*b*2 or 54*b*3 to the full-width heat generating member 54*b*1 is different. Here, a "power ratio R1" is the ratio of electric power supplied to the small-size heat generating member 54*b*2 to electric power supplied to the full-width heat generating member 54*b*1 for the small-size printing 2. A "power ratio R2" is the ratio of electric power supplied to the small-size heat generating member 54*b*3 to electric power supplied to the full-width heat generating member 54*b*1 for the small-size printing 2. In this case, the power ratio R2 for the small-size printing 2 is smaller than the power ratio R1 for the small-size printing 1 (R1>R2). In the present embodiment, electric power is supplied to the heat generating member 54*b* at the power ratio R1 for the small-size printing 1 and at the power ratio R2 for the small-size printing 2** as shown in Table 3.

TABLE 3

| | | Warming level | | | | |
|---|---|---|---|---|---|---|
| | Power ratio | 1 | 2 | 3 | 4 | 5 |
| Small-size printing 1 | R1 | 50% | 35% | 30% | 25% | 20% |
| Small-size printing 2 | R2 | 45% | 25% | 20% | 15% | 10% |

Table 3 is a table for determining the power ratio R1 for the small-size printing 1 and the power ratio R2 for the small-size printing 2. The power ratios R1 and R2 (%) are set with respect to the warming levels 1 to 5 described in Table 2. For example, at the warming level 1, the "power ratio R1" of the full-width heat generating member **54*b*1 to the heat generating member 54*b*2 for the small-size printing 1 is set to approximately 50%. At the same warming level 1, the "power ratio R2" of the full-width heat generating member 54*b*1 to the heat generating member 54*b*3 for the small-size printing 2 is set to approximately 45% (<50%). For the same warming level, the power ratio R2 is set to be smaller than the "power ratio R1". For other warming levels, the "power ratio R2" for the small-size printing 2 is smaller than the "power ratio R1" for the small-size printing 1**.

Since the small-size printing 2 prints on the sheet P having a narrower width than that in the small-size printing 1, the width of the non-passing portion with respect to the full-width heat generating member **54*b*1 is large. Since the fixing temperature sensor 59 is located in the paper passing portion near the center, the temperature at the position where the fixing temperature sensor 59** is located is lowered by the passing of the small-size paper.

That is, since temperature control is performed in the paper passing portion, the temperature of the fixing film 51 in the paper passing portion is controlled to be the target temperature. On the other hand, the non-passing portion, which receives heat from the heat generating member **54*b*1 by the fixing temperature sensor 59 in the passing portion in the same manner as the passing portion, heat is not deprived by the sheet P, so the non-passing portion becomes hotter than the passing portion. In the small-size printing 2, since the width of the non-passing portion is larger than that in the small-size printing 1, the temperature rise in the non-passing portion also tends to be large. Therefore, in the small-size printing 2, the power ratio of the heat generating member 54*b*1 is reduced compared to the small-size printing 1**.

[Heater Processing]

Next, heater processing in the present embodiment will be described using FIG. 8, with reference to FIGS. 2 and 3. Heater processing in the present embodiment is started by the control portion 94 with start of the "continuous image formation job" and is terminated with the termination of the "continuous image formation job". Incidentally, a case in which the small-size paper 1 is used will be used as an example to make the explanation easy to understand.

As shown in FIG. 8, the control portion 94 starts receiving a print signal (S1) which includes image data of the small- and large-size papers for image formation. Then, the control portion 94 initializes (S2) the power ratio R1 (first ratio) of the small-size printing 1 from the Table 3 shown above as the power ratio of the heat generating member during printing of the small-size paper in accordance with the print signal. The control portion 94 determines whether or not a print signal has been received for a large-size paper wider than the small-size paper (S3).

If a print signal has not been received for a large-size paper wider than the small-size paper (NO in S3), the control portion 94 jumps to the processing of step S9.

On the other hand, if a print signal has been received for a large-size paper wider than the small-size paper (YES in S3), the control portion 94 changes the power ratio of the heat generating member during printing of the small-size paper from the initial setting (S4). Changing the power ratio is, for example, changing the power ratio (second ratio) to 2 levels up from the warming level in Table 3. For example, if the warming level at the start of reception of the print signal is "2", the initial setting is such that electric power supplied to the heat generating member 54*b*1 is "35%", and electric power supplied to the heat generating member 54*b*2 is "100%". In this case, when a print signal is received for a large-size paper wider than the small-size paper, the power ratio of the heat generating member during printing of the small-size paper is changed to the warming level "4" setting, that is, electric power supplied to the heat generating member 54*b*1 is changed from "35%" to "25%". Incidentally, electric power supplied to the heat generating member 54*b*2 is maintained to be "100%".

In the present embodiment, if a job which continuously passes a predetermined number of sheets S through the fixing nip portion N is a job which continuously passes a large-size paper after the small-size paper, the power ratio is the second ratio, which is smaller than the first ratio. The first ratio is the power ratio of the initial setting, and in the present embodiment, if a job which continuously passes a predetermined number of sheets S through the fixing nip portion N is not a job which continuously passes a large-size paper after the small-size paper, the power ratio is the first ratio. Incidentally, the "predetermined number of sheets" said here is the number of sheets corresponding to the capacity of the memory that stores image data for image formation. For example, when performing a continuous image formation job on 1000 sheets P, if the memory capacity is a capacity that stores image data for a maximum of "100 sheets", image data for "100 sheets" will be successively stored in the memory. When performing a continuous image formation job to form images on 50 sheets P, image data for "50 sheets" will be stored in the memory.

Further, the job said here is a job to continuously perform image formation for the number of sheets S stored in the memory. If the job is a job which continuously passes large-size paper after small-size paper, the power ratio from the start of the job is the second ratio.

When printing of the small-size paper is terminated (S5), the control portion 94 performs "temperature equalization control" (S6). In "temperature equalization control", the heater 54 is controlled by the temperature of the non-passing through area to a decreasable temperature so as to heat the fixing film 51, and the fixing film 51 and the pressure roller 53 are controlled to idle-rotate (idle-rotation mode). The control portion 94 repeats "temperature equalization control" (S6) until the "temperature difference in the passing and non-passing through areas of the fixing film 51", that is, a "temperature difference ΔT between the detection temperature of the fixing temperature sensor 59 positioned in a central portion and the detection temperature of the fixing temperature sensor 59 positioned in one end" is equal to or less than the threshold temperature difference (here, 8° C.). If the temperature difference ΔT becomes equal to or less than the threshold temperature difference due to "temperature equalization control" (YES in S7), the control portion 94 terminates "temperature equalization control" (S8).

After the termination of "temperature equalization control" (S8), the control portion 94 passes the succeeding sheet. Then, the control portion 94 determines whether or not image formation has terminated (S10). If image formation has terminated (YES in S10), the control portion 94 terminates heater processing. If image formation has not terminated (NO in S10), the control portion 94 returns to the processing of step S3 and repeats the processing of the aforementioned steps S3 to S10.

As described above, in the present embodiment, if a print signal is received for a large-size paper wider than the small-size paper, the power ratio of the heat generating member during printing of the small-size paper is changed from the initial setting. If the power ratio of the heat generating member during printing of the small-size paper is changed (S4), electric power supplied to the heat generating member 54*b*1 is decreased from the initial setting. When electric power supplied to the heat generating member 54*b*1 is decreased, with the passing of small-size paper thereafter and before the passing of the large-size paper is started, the temperature of the non-passing portion decreases. If this is the case, when "temperature equalization control" is performed, the "temperature difference between the passing and the non-passing through areas in the fixing film 51" may already be the threshold temperature difference (here, 8° C.) or lower. Therefore, "temperature equalization control" is not performed after printing the small-size paper. Or, the "temperature difference between the passing and the non-passing through areas in the fixing film 51" is higher than the threshold temperature difference but is lower compared to the that of the initial setting, so even if "temperature equalization control" is performed, the time taken to attain the threshold temperature difference (here, 8° C.) or lower (processing time for temperature equalization control) is shorter compared to the conventional case. In this way, in the present embodiment, since the waiting time to start image formation for temperature equalization control can be shortened compared to the conventional case, the downtime of the image forming apparatus 900 can be reduced without generating a hot offset caused by the non-passing portion temperature rise.

Embodiment 2

Incidentally, the hot offset caused by the non-passing portion temperature rise occurs if the toner image is formed in the corresponding range of the large-size paper, and the likelihood of the occurrence of a hot offset differs depending on the continuity of dots constituting the toner image in the corresponding range of the large-size paper. The corresponding range of the large-size paper is the "area corresponding to the non-passing through area of the small-size paper of the large-size paper".

When the dots constituting the toner image are isolated, a hot offset is more likely to occur compared to when the dots are continuous. In view of this point, in the second embodiment described below, depending on whether or not toner image is formed in the corresponding range of the large-size paper and the continuity of the dots if the toner image is formed, a further reduction in the downtime of the image forming apparatus 900 is possible by changing the power ratio of the heat generating member during printing of the small-size paper. Hereinafter, "heater processing" to realize this will be described. FIG. 9 shows "heater processing" in the second embodiment. Incidentally, for the heater processing shown in FIG. 9, the same processes for "heater processing" (see FIG. 8) in the first embodiment described above are designated with the same step numbers, and the description will be simplified or omitted.

As shown in FIG. 9, the processes in steps S1 to S3 are the same processes as those for heater processing in the first embodiment described above. If a print signal is received for a large-size paper wider than the small-size paper (YES in S3), the "toner presence/absence in the detection area" is obtained (S21).

[Toner Presence/Absence Detection]

Here, detection of "toner presence/absence in the detection area" will be described using FIG. 10.

As shown in FIG. 10, the control portion 94 includes a CPU (Central Processing Unit) 304, a ROM (Read Only Memory) 305, a RAM (Random Access Memory) 306, a storage portion 307, and an image processing portion 308. These are connected to each other by a bus 315 so that data can be transmitted and received. The CPU 304 is executable by reading a program stored in the ROM 305. The RAM 306 is used as a memory to temporarily store programs and various data, that is, a main memory for a work.

The storage portion 307 is, for example, an HDD (Hard Disk Drive) etc., and stores image data etc. The image processing portion 308 includes an image generation portion 309, a color conversion processing portion 310, a toner presence/absence detection portion 311, a halftone processing portion 312, and a PWM processing portion 313, and executes image processes such as copying and printing. The image generation portion 309 generates raster image data capable of forming an image from image data received from the PC 110 (see FIG. 1) etc. and stored in the storage portion 307, and outputs RGB data and attribute data indicating the data attribute of each pixel for each pixel.

The color conversion processing portion 310 converts the RGB data outputted from the image generation portion 309 to CMYK according to the toner color, and performs color conversion processing which generates CMYK data and attribute data. The CMYK data shows information (hereinafter referred to as image density) relating to a toner application amount for cyan, magenta, yellow, and black (CMYK) colors, and is represented in 8-bits by "0 to 255" as a value in pixel units corresponding to each color. Specifically, if the pixel density value of each color in the CMYK data is "0", it indicates that the toner is not used. The density becomes higher as the pixel density value of each color increases, and a pixel density value of "255" indicates the maximum density of each color. A pixel density of "255" means "100%" of the toner application amount, and is the toner application amount in pixel units of the toner image formed by the value obtained by adding the toner application amount of each CMYK color. For example, if the pixel density indicates "255" among two CMYK colors, the value obtained by adding the pixel density of these two colors is "510" and becomes the toner application amount for the said pixels, which is "200%". The color conversion processing portion 310 sends the generated CMYK data and attribute data to the toner presence/absence detection portion 311 and the halftone processing portion 312.

The toner presence/absence detection portion 311 detects the presence/absence of toner in the detection area based on the CMYK data generated by the color conversion processing portion 310. The toner presence/absence detection portion 311 obtains a print area ratio (0 to 100%) of the detection area based on the CMYK data of the detection area, and if, for example, the print area ratio of the toner image formed in the detection area surpasses the threshold value (here, 1%), the toner presence/absence detection portion 311 detects the presence of toner in the detection area. In the present embodiment, the "detection area" which detects the presence/absence of toner is the "corresponding range corresponding to the non-passing through area of the small-size paper in the large-size paper", that is, the area formed between a "difference between the lengths of the small-size paper and the large-size paper" in the widthwise direction and the "length of the large-size paper" in the conveyance direction.

The halftone processing portion 312 performs halftone processing of the CMYK data of each color outputted from the color conversion processing portion 310. As halftone processing, there is, for example, screen processing or error diffusion processing. Screen processing converts the inputted CMYK data into an N-value using a predetermined plurality of dither matrices. Error diffusion processing performs N-value conversion of predetermined pixels by comparing the predetermined pixels of the inputted CMYK data with the threshold value, and diffuses the difference between the predetermined pixels generated by the N-value conversion and the threshold value to the surrounding pixels to be converted into an N-value thereafter.

The PWM processing portion 313 performs PWM (Pulse Width Modulation) conversion on the halftone CMYK data (referred to as halftone data) outputted from the halftone processing portion 312. The PWM processing portion 313 includes, for example, a conversion table (not shown) for performing PWM conversion of the image signal of the 4-bit halftone data, and the image signal of the halftone data is converted into a digital pixel signal used to turn the laser light ON/OFF according to this conversion table.

Returning to the description of FIG. 9, the control portion 94 determines the toner presence/absence in the detection area based on the "toner presence/absence in the detection area" received (S22). If there is no toner in the detection area (NO in S22), the control portion 94 jumps to the process in step S9. On the other hand, if there is toner in the detection area (YES in S22), the control portion 94 determines whether or not the toner image in the detection area is "Class 2" (S23).

[Image Classification]

Here, the classification processing of the toner image will be described using parts (a) and (b) of FIG. 11 with reference to FIG. 10. Parts (a) and (b) of FIG. 11 are figures to describe "classification processing". Classification processing is a process for classifying the toner image formed in the corresponding area into a predetermined class according to a range of continuous pixels onto which the toner of each CMYK color in the corresponding area is printed, based on image data related to the toner image formed in the corresponding area of the large-size paper. Classification processing is executed by the CPU 304 (see FIG. 10).

First, the CPU 304 generates edge data of each color for each pixel by comparing halftone data stored in the RAM 306 which is outputted from the halftone processing portion 312 with a predetermined threshold. The edge data is generated as "1" if the CMYK data of each color in the halftone data is equal to or larger than the threshold, and as "0" if the CMYK data of each color is smaller than the threshold. If the edge data is "1", it indicates that toner is printed on that pixel. Part (a) of FIG. 11 shows a part of the edge data for one page, and a reference numeral "601" indicates one pixel, which is the minimum unit. In Part (a) of FIG. 11, the edge data of a black pixel 601 is "1", and the edge data of a white pixel 601 is "0".

Next, the CPU 304 counts pixels having edge data different from edge data of an adjacent pixel with respect to edge data of each color for each pixel, and calculates an integrated value of edges for all pixels in a pixel block (for example, 8×8 pixels). In Part (a) of FIG. 11, reference numerals "601*a* to 601*e*" denote edge positions, and the CPU 304 calculates an edge rate by dividing the number of pixels with edges by the number of pixels per unit area. The edge ratio mentioned here uses the pixel block as a unit and means the ratio of the number of pixels with edges per unit area, that is, the number of pixels where the difference of pixel values from adjacent pixels is equal to or more than a predetermined value, to the number of pixels per unit area. The more isolated the dots are, the greater the number of pixels with edges per unit area in the pixel block. Incidentally, the unit of the edge rate is "%".

Then, the CPU 304 counts the continuity of dots in the image block whose edge ratio is equal to or less than a predetermined first threshold in the part of the page where the toner is printed, and further determines whether or not it contains an object whose continuity of dots is greater than a predetermined second threshold. If an object whose continuity of dots is greater than the second threshold is included, the CPU 304 judges the toner image formed by the image data as "Class 1". For example, as shown in part (b) of FIG. 11, if image data (602) includes large point characters or solid images, those large point characters or solid images are judged as "Class 1".

On the other hand, if the image block whose edge ratio is equal to or less than the first threshold does not include an object whose continuity is greater than the second threshold, the CPU 304 judges the toner image formed by the image data as "Class 2". For example, as shown in part (b) of FIG. 11, if image data (603) includes small point characters or halftone (HT) images, those small point characters or halftone images are judged as "Class 2".

Returning to the description of FIG. 9, if the toner image in the detection area is "Class 2" (YES in S23), the control portion 94 changes the power ratio of the heat generating element during printing of the small-size paper from the initial setting to the power ratio for when a halftone image is present (S24). The power ratio for when a halftone image is present is, for example, changed to a power ratio to 2 levels up from the warming level in Table 3. For example, if the warming level at the start of reception of the print signal is "3", the initial setting is such that electric power supplied to the heat generating member 54*b*1 is "30%", and electric power supplied to the heat generating member 54*b*2 is "100%". In this case, if the toner image in the detection area is "Class 2", the power ratio of the heat generating member during printing of the small-size paper is changed to the warming level "5" setting, that is, electric power supplied to the heat generating member 54*b*1 is changed from "30%" to "20%". Incidentally, electric power supplied to the heat generating member 54*b*2 is maintained to be "100%". After that, when the control portion 94 terminates the printing of the small-size paper, the control portion 94 executes the processes in the aforementioned steps S6 to S10.

On the other hand, if the toner image in the detection area is not "Class 2", that is, if it is "Class 1" (NO in S23), the control portion 94 changes the power ratio of the heat generating member during printing of the small-size paper from the initial setting to the power ratio for when the halftone image is absent (S25). The power ratio for when the halftone image is present is, for example, changed to a power ratio to 2 levels up from the warming level in Table 3. For example, if the warming level at the start of reception of the print signal is "3", if the toner image in the detection area is "Class 1", the power ratio of the heat generating member during printing of the small-size paper is changed to the warming level "4" setting, that is, electric power supplied to the heat generating member 54*b* 1 is changed from "30%" to "25%". That is, when the toner image in the detection area is "Class 1", the power ratio is changed to a higher power ratio than if the power ratio of the heat generating member during printing of the small-size paper is "Class 2". Incidentally, electric power supplied to the heat generating member 54*b*2 is maintained to be "100%".

After that, when the control portion 94 terminates the printing of the small-size paper, the control portion 94 executes "temperature equalization control" (S26). The control portion 94 repeats "temperature equalization control" until the temperature difference ΔT becomes equal to or less than the threshold temperature difference (here, 28° C.) (S26). When the temperature difference ΔT becomes equal to or less than the threshold temperature difference due to "temperature equalization control" (YES in S27), the control portion 94 terminates "temperature equalization control" (S8).

As described above, as in the first embodiment described above, in the second embodiment, if a print signal for a large-size paper wider than the small-size paper is received, the power ratio of the heat generating member during printing of the small-size paper is changed from the initial setting. In the present embodiment, electric power supplied to the heat generating member 54*b*1 is reduced. Also, in the second embodiment, the toner image is formed in the detection area, and electric power supplied to the heat generating member 54*b*1 is changed depending on the image pattern in the toner image. As described above, for example, if a solid image is formed in the detection area, the processing time for "temperature equalization control" is shortened by changing the power ratio of the heat generating member to a higher ratio compared to when the halftone image is formed in the detection area. By doing so, the downtime of the image forming apparatus 900 can be reduced without generating a hot offset caused by the non-passing portion temperature rise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-209572 filed on Dec. 27, 2022, which is hereby incorporated by reference herein in its entirety.

What is claimed is:

1. An image forming apparatus comprising:

a first rotatable member configured to heat a recording material;

a heater configured to heat the first rotatable member; the heater provided with a first heat generating member and a second heat generating member, and in a widthwise direction crossing a conveyance direction of the recording material a length of the first heat generating member is longer than a length of the second heat generating member;

a second rotatable member configured to form a fixing nip portion in contact with the first rotatable member, the second rotatable member fixing a toner image on the recording material with the first rotatable member; and a control portion configured to control a temperature of the heater by an electric power supplied to the first heat generating member and the second heat generating member, wherein the image forming apparatus is capable of performing image formation on a first recording material of which length is shorter than the second heat generating member in the widthwise direction, and a second recording material of which length is equal to or shorter than the first heat generating member and longer than the second heat generating member, wherein in a case of a job in which a first sheet is the first recording material and a second sheet carried successively to the first sheet is the first recording material, an electric power supplied to the first heat generating member is a first electric power while the first recording material as the first sheet passes through the fixing nip portion, and wherein in a case of a job in which the first sheet is the first recording material and the second sheet that is carried successively to the first sheet is the second recording material, the electric power supplied to the first heat generating member is a second electric power smaller than the first electric power while the first recording material as the first sheet passes through the fixing nip portion.

2. An image forming apparatus according to claim 1, wherein the first heat generating member and the second heat generating member heat while the first recording material passes through the fixing nip portion.

3. An image forming apparatus according to claim 2, further comprising an acquiring portion configured to acquire information on lengths of the first and second sheets with respect to the widthwise direction before starting the job, wherein the control portion supplies the electric power to the first heat generating member and the second heat generating member based on the information acquired by the acquiring portion.

4. An image forming apparatus according to claim 3, further comprising a temperature detecting portion configured to detect a temperature of the heater, wherein the electric power supplied to the first heat generating member while the first recording material passes through the fixing nip portion in a case in which the temperature detected by the temperature detecting portion is a first temperature is larger than the electric power supplied to the first heat generating member while the first recording material passes through the fixing nip portion in a case in which the temperature detected by the temperature detecting portion is higher than the first temperature.

5. An image forming apparatus according to claim 3, wherein the electric power supplied to the first heat generating member in a case in which the toner image to be formed exists in a corresponding range corresponding to the second recording material overlapped with a non-passing through area where the first recording material with respect to the widthwise direction is smaller than the electric power supplied to the first heat generating member in a case in which the toner image to be formed does not exist in the corresponding range.

6. An image forming apparatus according to claim 5, wherein the electric power supplied to the first heat generating member in a case in which the toner image to be formed exists in the corresponding range and the toner image formed on the corresponding range is a halftone image is smaller than the electric power supplied to the first heat generating member in a case in which the toner image formed on the corresponding range does not include the halftone image.

7. An image forming apparatus according to claim 3, wherein the electric power supplied to the first heat generating member in a case in which a print area ratio of the toner image, formed in a corresponding range corresponding to second recording material overlapped with a non-passing through area where the first recording material with respect to the widthwise direction, exceeds a threshold value is smaller than the electric power supplied to the first heat generating member in a case in which the print area ratio to the toner image does not exceed the threshold value.

8. An image forming apparatus according to claim 1, wherein a magnitude of the first electric power and the second electric power is a ratio of the electric power supplied to the first heat generating member to the electric power supplied to the second heat generating member.

9. An image forming apparatus according to claim 1, wherein the heater is provided with a third heat generating member of which a length is shorter than the length of the second heat generating member with respect to the widthwise direction, wherein the image forming apparatus is capable of performing the image formation on a third recording material of which a length is shorter than the length of the first recording material with respect to the widthwise direction.

10. An image forming apparatus according to claim 9, wherein the electric power supplied to the first heat generating member while the first recoding material passes through the fixing nip portion is larger than the electric power supplied to the first heat generating member while the third recoding material passes through the fixing nip portion.

11. An image forming apparatus according to claim 9, wherein the control portion exclusively controls the electric power supplied to the second heat generating member and the third heat generating member.

12. An image forming apparatus comprising:

a first rotatable member configured to heat a recording material;

a heater configured to heat the first rotatable member; the heater provided with a first heat generating member and a second heat generating member, and in a widthwise direction crossing a conveyance direction of the recording material the first heat generating member heating in an outer area of the second heat generating member;

a second rotatable member configured to form a fixing nip portion in contact with the first rotatable member, the second rotatable member fixing a toner image on the recording material with the first rotatable member; and a control portion configured to control a temperature of the heater by an electric power supplied to the first heat generating member and the second heat generating member, wherein the image forming apparatus is capable of performing image formation on a first recording material of which length is shorter than the second heat generating member in the widthwise direction, and a second recording material of which length is equal to or shorter than a maximum width where a fixing device is capable of fixing and longer than the second heat generating member, wherein in a case of a job in which a first sheet is the first recording material and a second sheet is the first recording material, an electric power supplied to the first heat generating member is a first electric power while the first recording material as the first sheet passes through the fixing nip portion, and wherein in a case of a job in which the first sheet is the first recording material and the second sheet is the second recording material, the electric power supplied to the first heat generating member is a second electric power smaller than the first electric power while the first recording material as the first sheet passes through the fixing nip portion.

* * * * *